US006142875A

United States Patent [19]

Kodachi et al.

[11] Patent Number: 6,142,875

[45] Date of Patent: *Nov. 7, 2000

[54] GAMING MACHINE

[75] Inventors: Kazuyoshi Kodachi; Humio Nakano, both of Tokyo, Japan

[73] Assignee: Aruze Corporation, Tokyo, Japan

[ * ] Notice: This patent is subject to a terminal disclaimer.

[21] Appl. No.: 09/318,517

[22] Filed: May 25, 1999

[30] Foreign Application Priority Data

May 27, 1998 [JP] Japan .................................. 10-146387
Dec. 2, 1998 [JP] Japan .................................. 10-343039

[51] Int. Cl.[7] ..................................................... A63F 13/00

[52] U.S. Cl. .......................... 463/20; 463/16; 273/121 B; 273/143 R

[58] Field of Search ................................. 463/16, 20, 21, 463/30, 31, 23; 273/121 B, 143 R

[56] References Cited

U.S. PATENT DOCUMENTS 5,018,737 5/1991 Okada ................................ 273/143 R
5,024,439 6/1991 Okada ................................ 273/143 R

*Primary Examiner*—Jessica J. Harrison
*Assistant Examiner*—Julie Kasick
*Attorney, Agent, or Firm*—Rohm & Monsanto, P.L.C.

[57] ABSTRACT

A gaming machine has a symbol display arrangement that displays a variation action of a variable plurality of symbols that are necessary for playing a game. A predictive display arrangement performs a predictive display that informs the player of the likelihood of the appearance of a specific symbol display state when the variation action is stopped. A determination whether or not the symbol variation action is to be stopped with the appearance thereon of the specific symbol display state is made by a controller that also determines which predictive display mode from among a plurality of predetermined predictive display modes is to be displayed. In one embodiment, the controller controls the predictive display arrangement so that the probability of the appearance of a specific symbol display state is changeable in conjunction with the change in the game with the passage of time. The player will expect the appearance of the predictive display having a high likelihood, and therefore the player's expectation of the appearance of the specific symbol display state can be sustained from the start of the variation display to the stopping thereof The player's expectation for the "big hit" is enhanced by changing the predictive display in which the likelihood of the "big hit" is increased. A second predictive display depicts a second likelihood of the appearance of the specific symbol display state. The controller controls the predictive display arrangement so that the likelihood of the appearance of the specific symbol display state by the second predictive display is changeable with a change in the game resulting from the passage of time.

29 Claims, 45 Drawing Sheets

FIG. 3
FACE PROGNOSTIC DETERMINATION TABLE
("BIG HIT + CLAPPING REACH")
| PROGNOSTIC GROUP | RANDOM NUMBER FOR PROGNOSTIC DISPLAY DETERMINATION | |
|---|---|---|
| A GROUP | 0~40 | 41~80 |
| | FACE SYMBOL 1  | FACE SYMBOL 2  |
| B GROUP | 81~96 | 97~110 |
| | FACE SYMBOL 3  | FACE SYMBOL 4  |
| C GROUP | 111~115 | 116~119 |
| | FACE SYMBOL 5  | FACE SYMBOL 6  |
| D GROUP | 120~129 | 130~139 |
| | FACE SYMBOL 7 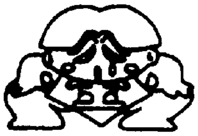 | FACE SYMBOL 8  |

FIG. 8

| KIND OF RANDOM NUMBER | RANDOM NUMBER VALUE |
| --- | --- |
| RANDOM NUMBER FOR JUDGEMENT OF "BIG HIT" | 0～255 |
| RANDOM NUMBER FOR "REACH" DEMO. DETERMINATION | 0～139 |
| RANDOM NUMBER FOR FACE PROGNOSTIC DETERMINATION | 0～139 |

FIG. 9

"BIG HIT" JUDGEMENT TABLE

| JUDGEMENT OF "HIT" | RANDOM NUMBER FOR JUDGEMENT OF "BIG HIT" | PROBABILITY |
| --- | --- | --- |
| "BIG HIT" | 7 | 1/256 |
| "LOSS" | 0～6,8～255 | 255/256 |

FIG. 10

TABLE FOR DETERMINATION OF "BIG HIT" SYMBOL

| RANDOM NUMBER FOR "BIG HIT" SYMBOL DETERMINATION | "BIG HIT" SYMBOL |
|---|---|
| 0 | 1-1-1 |
| 1 | 2-2-2 |
| 2 | 3-3-3 |
| 3 | 4-4-4 |
| 4 | 5-5-5 |
| 5 | 6-6-6 |
| 6 | 7-7-7 |
| 7 | 8-8-8 |
| 8 | 9-9-9 |
| 9 | 10-10-10 |
| 10 | 11-11-11 |
| 11 | 12-12-12 |
| 12 | 13-13-13 |
| 13 | 14-14-14 |
| 14 | 15-15-15 |

FIG. 11

TABLE FOR DETERMINATION OF STOP SYMBOL

| RANDOM NUMBER FOR LEFT, CENTER, RIGHT STOP SYMBOL DETERMINATION | STOP SYMBOL |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |

FIG. 12

TABLE FOR DETERMINATION OF "REACH" DEMO. FOR "BIG HIT"

| KIND OF "REACH" | RANDOM NUMBER FOR "REACH" DEMO. DETERMINATION | PROBABILITY |
|---|---|---|
| "CLAPPING REACH" | 0~24 | 25/140 |
| "HARITE REACH" | 25~64 | 40/140 |
| "ALL ROTAION REACH" | 65~139 | 75/140 |

FIG. 13

TABLE FOR DETERMINATION OF "REACH" DEMO. FOR "LOSS"

| KIND OF "REACH" | RANDOM NUMBER FOR "REACH" DEMO. DETERMINATION | PROBABILITY |
|---|---|---|
| "CLAPPING REACH" | 0~4 | 5/140 |
| "HARITE REACH" | 5~8 | 4/140 |
| NO "REACH" | 9~139 | 131/140 |

(I) "BIG HIT + CLAPPING REACH"
(II) "BIG HIT + HARITE REACH"
(III) "BIG HIT + ALL ROTATION REACH"
(IV) "LOSS + CLAPPING REACH"
(V) "LOSS + HARITE REACH"
(VI) "LOSS + NO REACH"

FACE PROGNOSTIC 1

FACE PROGNOSTIC 2

"CLAPPING REACH"

"HARITE REACH"

DRAGONFLY PROGNOSTIC

FIGHTING PROGNOSTIC

BEAR PROGNOSTIC

RIGHT LEG LIFTING PROGNOSTIC

LEFT LEG LIFTING PROGNOSTIC

SMALL DEGREE LEG LIFTING

FIG. 35

PROGNOSTIC DISPLAY DETERMINATION TABLE B

| COMBINATION OF RESULT FOR JUDGEMENT OF "BIG HIT" & KIND OF "REACH" | KIND OF PROGNOSTIC DISPLAY | RANDOM NUMBER C FOR PROGNOSTIC DISPLAY FOR DETERMINATION |
|---|---|---|
| (I) "BIG HIT + CLAPPING REACH" | DRAGONFLY PROGNOSTIC | 0~20 |
| | FIGHTING PROGNOSTIC | 21~70 |
| | RIGHT LEG PROGNOSTIC | 71~80 |
| | LEFT LEG PROGNOSTIC | 81~89 |
| (II) "BIG HIT + HARITE REACH" | DRAGONFLY PROGNOSTIC | 0~20 |
| | FIGHTING PROGNOSTIC | 21~40 |
| (III) "BIG HIT + ALL ROTATION REACH" | DRAGONFLY PROGNOSTIC | 0~5 |
| | BEAR PROGNOSTIC | 6~60 |
| (IV) "LOSS + CLAPPING REACH" | DRAGONFLY PROGNOSTIC | 81~85 |
| | FIGHTING PROGNOSTIC | 86~90 |
| | RIGHT LEG PROGNOSTIC | 91~110 |
| | LEFT LEG PROGNOSTIC | 111~130 |
| (IV) "LOSS + HARITE REACH" | DRAGONFLY PROGNOSTIC | 81~90 |
| | FIGHTING PROGNOSTIC | 91~95 |
| | RIGHT LEG PROGNOSTIC | 96~110 |
| | LEFT LEG PROGNOSTIC | 111~139 |
| (IV) "LOSS + NO REACH" | DRAGONFLY PROGNOSTIC | 91~95 |
| | FIGHTING PROGNOSTIC | 96~100 |

FIG. 38

APPEARANCE PROBABILITY TABLE

| JUDGEMENT FOR "BIG HIT" | "REACH" DEMO. | ⓐ | ⓑ | ⓒ | ⓓ | ⓔ |
|---|---|---|---|---|---|---|
| "BIG HIT" APPEARANCE PROBABILITY =1/256 | "CLAPPING REACH" APPEARANCE PROBABILITY =25/140 | A | A | 12/40 | 300/1433600 | 0.021% |
| | | | B | 2/40 | 50/1433600 | 0.003% |
| | | | C | 4/40 | 100/1433600 | 0.007% |
| | | | D | 0 | 0/1433600 | 0% |
| | | B | A | 2/40 | 50/1433600 | 0.003% |
| | | | B | 9/40 | 225/1433600 | 0.016% |
| | | | C | 2/40 | 50/1433600 | 0.003% |
| | | | D | 1/40 | 25/1433600 | 0.002% |
| | | C | A | 4/40 | 100/1433600 | 0.007% |
| | | | B | 1/40 | 25/1433600 | 0.002% |
| | | | C | 0 | 0/1433600 | 0% |
| | | | D | 0 | 0/1433600 | 0% |
| | | D | A | 0 | 0/1433600 | 0% |
| | | | B | 0 | 0/1433600 | 0% |
| | | | C | 1/40 | 25/1433600 | 0.002% |
| | | | D | 2/40 | 50/1433600 | 0.003% |
| | "HARITE REACH" APPEARANCE PROBABILITY =40/140 | A | A | 2/40 | 80/1433600 | 0.006% |
| | | | B | 3/40 | 120/1433600 | 0.008% |
| | | | C | 4/40 | 160/1433600 | 0.011% |
| | | | D | 1/40 | 40/1433600 | 0.003% |
| | | B | A | 9/40 | 360/1433600 | 0.025% |
| | | | B | 0 | 0/1433600 | 0% |
| | | | C | 2/40 | 80/1433600 | 0.006% |
| | | | D | 2/40 | 80/1433600 | 0.006% |
| | | C | A | 2/40 | 80/1433600 | 0.006% |
| | | | B | 6/40 | 240/1433600 | 0.017% |
| | | | C | 2/40 | 80/1433600 | 0.006% |
| | | | D | 1/40 | 40/1433600 | 0.003% |
| | | D | A | 1/40 | 40/1433600 | 0.003% |
| | | | B | 1/40 | 40/1433600 | 0.003% |
| | | | C | 2/40 | 80/1433600 | 0.006% |
| | | | D | 2/40 | 80/1433600 | 0.006% |
| | "ALL ROTATION REACH" APPEARANCE PROBABILITY =75/140 | A | A | 15/40 | 1125/1433600 | 0.078% |
| | | | B | 3/40 | 225/1433600 | 0.016% |
| | | | C | 0 | 0/1433600 | 0% |
| | | | D | 1/40 | 75/1433600 | 0.005% |
| | | B | A | 1/40 | 75/1433600 | 0.005% |
| | | | B | 12/40 | 900/1433600 | 0.063% |
| | | | C | 0 | 0/1433600 | 0% |
| | | | D | 0 | 0/1433600 | 0% |
| | | C | A | 8/40 | 600/1433600 | 0.042% |
| | | | B | 0 | 0/1433600 | 0% |
| | | | C | 0 | 0/1433600 | 0% |
| | | | D | 0 | 0/1433600 | 0% |
| | | D | A | 0 | 0/1433600 | 0% |
| | | | B | 0 | 0/1433600 | 0% |
| | | | C | 0 | 0/1433600 | 0% |
| | | | D | 0 | 0/1433600 | 0% |

ⓐFACE PROGNOSTIC 1 ⓑFACE PROGNOSTIC 2 ⓒRATE OF APPEARANCE
ⓓPROBABILITY DATA ⓔAPPEARANCE PROBABILITY

FIG. 39

APPEARANCE PROBABILITY TABLE

| JUDGEMENT FOR "BIG HIT" | "REACH" DEMO. | ⓐ | ⓑ | ⓒ | ⓓ | ⓔ |
|---|---|---|---|---|---|---|
| "LOSS"<br>APPEARANCE PROBABILITY =255/256 | "CLAPPING REACH"<br>APPEARANCE PROBABILITY =5/140 | A | A | 2/40 | 2550/1433600 | 0.18% |
| | | | B | 3/40 | 3825/1433600 | 0.27% |
| | | | C | 4/40 | 5100/1433600 | 0.36% |
| | | | D | 1/40 | 1275/1433600 | 0.09% |
| | | B | A | 2/40 | 2550/1433600 | 0.18% |
| | | | B | 4/40 | 5100/1433600 | 0.36% |
| | | | C | 1/40 | 1275/1433600 | 0.09% |
| | | | D | 0 | 0/1433600 | 0% |
| | | C | A | 0 | 0/1433600 | 0% |
| | | | B | 4/40 | 5100/1433600 | 0.36% |
| | | | C | 13/40 | 16575/1433600 | 11.60% |
| | | | D | 1/40 | 1275/1433600 | 0.09% |
| | | D | A | 1/40 | 1275/1433600 | 0.90% |
| | | | B | 1/40 | 1275/1433600 | 0.09% |
| | | | C | 3/40 | 3825/1433600 | 0.27% |
| | | | D | 0 | 0/1433600 | 0% |
| | "HARITE REACH"<br>APPEARANCE PROBABILITY =4/140 | A | A | 0 | 0/1433600 | 0% |
| | | | B | 8/40 | 8160/1433600 | 0.60% |
| | | | C | 2/40 | 2040/1433600 | 0.14% |
| | | | D | 0 | 0/1433600 | 0% |
| | | B | A | 8/40 | 8160/1433600 | 0.60% |
| | | | B | 0 | 0/1433600 | 0% |
| | | | C | 0 | 0/1433600 | 0% |
| | | | D | 3/40 | 3060/1433600 | 0.21% |
| | | C | A | 0 | 0/1433600 | 0% |
| | | | B | 3/40 | 3060/1433600 | 0.21% |
| | | | C | 3/40 | 3060/1433600 | 0.21% |
| | | | D | 2/40 | 2040/1433600 | 0.14% |
| | | D | A | 2/40 | 2040/1433600 | 0.14% |
| | | | B | 4/40 | 4080/1433600 | 0.28% |
| | | | C | 0 | 0/1433600 | 0% |
| | | | D | 5/40 | 5100/1433600 | 0.36% |
| | "NO REACH"<br>APPEARANCE PROBABILITY =131/140 | A | A | 0 | 0/1433600 | 0% |
| | | | B | 0 | 0/1433600 | 0% |
| | | | C | 2/40 | 66810/1433600 | 4.66% |
| | | | D | 2/40 | 66810/1433600 | 4.66% |
| | | B | A | 1/40 | 33405/1433600 | 2.33% |
| | | | B | 0 | 0/1433600 | 0% |
| | | | C | 2/40 | 66810/1433600 | 4.66% |
| | | | D | 2/40 | 66810/1433600 | 4.66% |
| | | C | A | 1/40 | 33405/1433600 | 2.33% |
| | | | B | 1/40 | 33405/1433600 | 2.33% |
| | | | C | 3/40 | 100215/1433600 | 6.99% |
| | | | D | 2/40 | 66810/1433600 | 4.66% |
| | | D | A | 1/40 | 33405/1433600 | 2.33% |
| | | | B | 7/40 | 233835/1433600 | 16.31% |
| | | | C | 3/40 | 100215/1433600 | 6.99% |
| | | | D | 13/40 | 434265/1433600 | 30.29% |

ⓐFACE PROGNOSTIC 1 ⓑFACE PROGNOSTIC 2 ⓒRATE OF APPEARANCE
ⓓPROBABILITY DATA ⓔAPPEARANCE PROBABILITY

FIG. 40

PROBABILITY OF DEVELOPMENT INTO "BIG HIT"

| FACE PROGNOSTIC 1 | FACE PROGNOSTIC 2 | ① CASE OF DEVELOPMENT INTO "BIG HIT"<br>(I) "BIG HIT + CLAPPING REACH"<br>(II) "BIG HIT + HARITE REACH"<br>(III) "BIG HIT + ALL ROTATION REACH" | ② CASE OF DEVELOPMENT INTO "LOSS"<br>(IV) "LOSS + CLAPPING REACH"<br>(V) "LOSS + HARITE REACH"<br>(VI) "LOSS" + NO REACH" | PROBABILITY OF DEVELOPMENT<br>①/(①+②) |
|---|---|---|---|---|
| A | A | 1505/1433600 | 2550/1433600 | 37.11% |
| | B | 395/1433600 | 11985/1433600 | 3.19% |
| | C | 260/1433600 | 73950/1433600 | 0.35% |
| | D | 115/1433600 | 68085/1433600 | 0.17% |
| B | A | 485/1433600 | 44115/1433600 | 1.09% |
| | B | 1125/1433600 | 5100/1433600 | 18.07% |
| | C | 130/1433600 | 68085/1433600 | 0.19% |
| | D | 105/1433600 | 69870/1433600 | 0.15% |
| C | A | 780/1433600 | 33405/1433600 | 2.28% |
| | B | 265/1433600 | 41565/1433600 | 0.63% |
| | C | 80/1433600 | 119850/1433600 | 0.07% |
| | D | 40/1433600 | 70125/1433600 | 0.06% |
| D | A | 40/1433600 | 36720/1433600 | 0.11% |
| | B | 40/1433600 | 239190/1433600 | 0.02% |
| | C | 105/1433600 | 104040/1433600 | 0.10% |
| | D | 130/1433600 | 439365/1433600 | 0.03% |

FIG. 41

PROBABILITY OF DEVELOPMENT INTO "REACH"

| FACE PROGNOSTIC 1 | FACE PROGNOSTIC 2 | ① CASE OF DEVELOPMENT INTO "REACH"<br>(I) "BIG HIT + CLAPPING REACH"<br>(II) "BIG HIT + HARITE REACH"<br>(III) "BIG HIT + ALL ROTATION REACH"<br>(IV) "LOSS + CLAPPING REACH"<br>(V) "LOSS + HARITE REACH" | ② CASE OF DEVELOPMENT NOT INTO "REACH"<br>(VI) "LOSS + NO REACH" | PROBABILITY OF DEVELOPMENT<br>①/(①+②) |
|---|---|---|---|---|
| A | A | 4055/1433600 | 0 | 100% |
| | B | 12380/1433600 | 0 | 100% |
| | C | 7400/1433600 | 66810/1433600 | 10% |
| | D | 1390/1433600 | 66810/1433600 | 2% |
| B | A | 11195/1433600 | 33405/1433600 | 25% |
| | B | 6225/1433600 | 0 | 100% |
| | C | 1405/1433600 | 66810/1433600 | 2% |
| | D | 3165/1433600 | 66810/1433600 | 5% |
| C | A | 780/1433600 | 33405/1433600 | 2% |
| | B | 8425/1433600 | 33405/1433600 | 20% |
| | C | 19715/1433600 | 100215/1433600 | 16% |
| | D | 3355/1433600 | 66810/1433600 | 5% |
| D | A | 3355/1433600 | 33405/1433600 | 9% |
| | B | 5395/1433600 | 233835/1433600 | 2% |
| | C | 3930/1433600 | 100215/1433600 | 4% |
| | D | 5230/1433600 | 434265/1433600 | 1% |

FIG. 45

| KIND OF RANDOM NUMBER | RANDOM NUMBER VALUE |
|---|---|
| RANDOM NUMBER FOR JUDGEMENT OF "BIG HIT" | 0~255 |
| RANDOM NUMBER FOR "REACH" DEMO. DETERMINATION | 0~139 |
| RANDOM NUMBER FOR DETERMINATION OF PROGNOSTIC DISPLAY COMBINATION | 0~39 |

FIG. 46

(I) "BIG HIT + CLAPPING REACH"

| FACE PROGNOSTIC 1 | FACE PROGNOSTIC 2 | RANDOM NUMBER FOR DETERMINATION OF PROGNOSTIC DISPLAY COMBINATION |
|---|---|---|
| A | A | 0 |
| | | 1 |
| | | 2 |
| | | 3 |
| | | 4 |
| | | 5 |
| | | 6 |
| | | 7 |
| | | 8 |
| | | 9 |
| | | 10 |
| | | 11 |
| | B | 12 |
| | | 13 |
| | C | 14 |
| | | 15 |
| | | 16 |
| | | 17 |
| B | A | 18 |
| | | 19 |
| | B | 20 |
| | | 21 |
| | | 22 |
| | | 23 |
| | | 24 |
| | | 25 |
| | | 26 |
| | | 27 |
| | | 28 |
| | C | 29 |
| | | 30 |
| | D | 31 |
| C | A | 32 |
| | | 33 |
| | | 34 |
| | | 35 |
| | B | 36 |
| D | C | 37 |
| | D | 38 |
| | | 39 |

FIG. 47

(II)"BIG HIT + HARITE REACH"

| FACE PROGNOSTIC 1 | FACE PROGNOSTIC 2 | RANDOM NUMBER FOR DETERMINATION OF PROGNOSTIC DISPLAY COMBINATION |
|---|---|---|
| A | A | 0 |
| | | 1 |
| | B | 2 |
| | | 3 |
| | | 4 |
| | C | 5 |
| | | 6 |
| | | 7 |
| | | 8 |
| | D | 9 |
| B | A | 10 |
| | | 11 |
| | | 12 |
| | | 13 |
| | | 14 |
| | | 15 |
| | | 16 |
| | | 17 |
| | | 18 |
| | C | 19 |
| | | 20 |
| | D | 21 |
| | | 22 |
| C | A | 23 |
| | | 24 |
| | B | 25 |
| | | 26 |
| | | 27 |
| | | 28 |
| | | 29 |
| | | 30 |
| | C | 31 |
| | | 32 |
| | D | 33 |
| D | A | 34 |
| | B | 35 |
| | C | 36 |
| | | 37 |
| | D | 38 |
| | | 39 |

FIG.48

(Ⅲ)"BIG HIT + ALL ROTATION REACH"

| FACE PROGNOSTIC 1 | FACE PROGNOSTIC 2 | RANDOM NUMBER FOR DETERMINATION OF PROGNOSTIC DISPLAY COMBINATION |
|---|---|---|
| A | A | 0 |
| | | 1 |
| | | 2 |
| | | 3 |
| | | 4 |
| | | 5 |
| | | 6 |
| | | 7 |
| | | 8 |
| | | 9 |
| | | 10 |
| | | 11 |
| | | 12 |
| | | 13 |
| | | 14 |
| | B | 15 |
| | | 16 |
| | | 17 |
| | D | 18 |
| B | A | 19 |
| | B | 20 |
| | | 21 |
| | | 22 |
| | | 23 |
| | | 24 |
| | | 25 |
| | | 26 |
| | | 27 |
| | | 28 |
| | | 29 |
| | | 30 |
| | | 31 |
| C | A | 32 |
| | | 33 |
| | | 34 |
| | | 35 |
| | | 36 |
| | | 37 |
| | | 38 |
| | | 39 |

FIG. 49

(IV) "LOSS + CLAPPING REACH"

| FACE PROGNOSTIC 1 | FACE PROGNOSTIC 2 | RANDOM NUMBER FOR DETERMINATION OF PROGNOSTIC DISPLAY COMBINATION |
|---|---|---|
| A | A | 0 |
| | | 1 |
| | B | 2 |
| | | 3 |
| | | 4 |
| | C | 5 |
| | | 6 |
| | | 7 |
| | | 8 |
| | D | 9 |
| B | A | 10 |
| | | 11 |
| | B | 12 |
| | | 13 |
| | | 14 |
| | | 15 |
| | C | 16 |
| C | B | 17 |
| | | 18 |
| | | 19 |
| | | 20 |
| | C | 21 |
| | | 22 |
| | | 23 |
| | | 24 |
| | | 25 |
| | | 26 |
| | | 27 |
| | | 28 |
| | | 29 |
| | | 30 |
| | | 31 |
| | | 32 |
| | | 33 |
| | D | 34 |
| D | A | 35 |
| | B | 36 |
| | C | 37 |
| | | 38 |
| | | 39 |

FIG. 50

(V)"LOSS + HARITE REACH"

| FACE PROGNOSTIC 1 | FACE PROGNOSTIC 2 | RANDOM NUMBER FOR DETERMINATION OF PROGNOSTIC DISPLAY COMBINATION |
|---|---|---|
| A | B | 0 |
| | | 1 |
| | | 2 |
| | | 3 |
| | | 4 |
| | | 5 |
| | | 6 |
| | | 7 |
| | C | 8 |
| | | 9 |
| B | A | 10 |
| | | 11 |
| | | 12 |
| | | 13 |
| | | 14 |
| | | 15 |
| | | 16<br>17 |
| | D | 18 |
| | | 19 |
| | | 20 |
| C | B | 21 |
| | | 22 |
| | | 23 |
| | C | 24 |
| | | 25 |
| | | 26 |
| | D | 27 |
| | | 28 |
| D | A | 29 |
| | | 30 |
| | B | 31 |
| | | 32 |
| | | 33<br>34 |
| | D | 35 |
| | | 36 |
| | | 37 |
| | | 38 |
| | | 39 |

FIG. 51

(VI)"LOSS + NO REACH"

| FACE PROGNOSTIC 1 | FACE PROGNOSTIC 2 | RANDOM NUMBER FOR DETERMINATION OF PROGNOSTIC DISPLAY COMBINATION |
|---|---|---|
| A | C | 0 |
| | | 1 |
| | D | 2 |
| | | 3 |
| B | A | 4 |
| | C | 5 |
| | | 6 |
| | D | 7 |
| | | 8 |
| C | A | 9 |
| | B | 10 |
| | C | 11 |
| | | 12 |
| | | 13 |
| | D | 14 |
| | | 15 |
| D | A | 16 |
| | | 17 |
| | B | 18 |
| | | 19 |
| | | 20 |
| | | 21 |
| | | 22 |
| | | 23 |
| | C | 24 |
| | | 25 |
| | | 26 |
| | D | 27 |
| | | 28 |
| | | 29 |
| | | 30 |
| | | 31 |
| | | 32 |
| | | 33 |
| | | 34 |
| | | 35 |
| | | 36 |
| | | 37 |
| | | 38 |
| | | 39 |

FIG. 52
FACE SYMBOL DETERMINATION TABLE
| PROGNOSTIC GROUP | RANDOM NUMBER FOR DETERMINATION OF PROGNOSTIC DISPLAY COMBINATION | |
|---|---|---|
| | CASE OF EVEN RANDOM NUMBER | CASE OF ODD RANDOM NUMBER |
| A GROUP | FACE SYMBOL 1  | FACE SYMBOL 2  |
| B GROUP | FACE SYMBOL 3 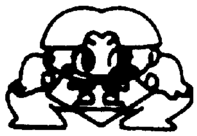 | FACE SYMBOL 4  |
| C GROUP | FACE SYMBOL 5  | FACE SYMBOL 6  |
| D GROUP | FACE SYMBOL 7 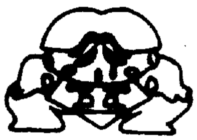 | FACE SYMBOL 8  |

GAMING MACHINE

BACKGROUND OF THE INVENTION

1. Field of the Invention

The present invention relates to a gaming machine such as a pachinko game machine that is provided with a variable display for displaying a varying plurality of symbols necessary for a game, and a controller, such as a microcomputer, for controlling the variable display.

2. Description of the Related Art

A ball-shooting gaming machine, such as a pachinko game machine, is provided with a symbol display that is arranged to commence display of a varying plurality of symbols when a predetermined condition is satisfied, and rewards a player when the variation of the symbols is stopped while the symbol display presents a display of a predetermined combination of symbols. In recent years, an electrical display, such as a liquid crystal display, is commonly used as the symbol display since various effects can be demonstrated therein.

Such electrical displays permit various indications or demonstrations that enhance the player's interest in the game. For example, such indications may include: a real-time indication of the number of times during a game that an advantageous open state has been attained in response to a specified combination of symbols (e.g., "big bit"); a real-time indication of the number of playing balls that entered a variable winning device; a change in a background color to indicate in an exciting way that a specified pattern of symbols corresponds to a "big hit;" the appearance of new characters that are different from the symbols that will be variably displayed; an indication of a pattern with unusual motion to indicate that the "big hit" can be obtained if one more special symbol is arranged in the display (i.e., "reach state"), thereby indicating to the player that a "big hit" may soon appear; etc.

A particularly useful demonstration for elevating the player's interest is a pattern or symbol variation display that is termed a "reach action" in the "reach state" mentioned above. When the reach action begins, the player's attention is drawn to the display with an expectation of the appearance of a "big hit." The reach action includes, for example, a change in the speed of the displayed pattern or symbol variation, a change of the duration of the symbol variation, or the like. Sometimes, the "big hit" will appear 100% of the time after a special reach action. Thus, such a reach action is predictive of the appearance of a "big hit."

The reach action on a display of a conventional gaming machine, however, may disadvantageously be but a simple indication, such as a change of speed or duration of a particular pattern or symbol variation. Since the "big hit" might not always appear, the conventional simple indication may betray the player's expectation and thereby have the contrary effect of reducing the player's interest in the game.

In addition, as mentioned above, it is known that the reach action is carried out by indicating a symbol (or a character) other than the symbols that are variably displayed. The conventional reach action is but a simple symbol indication, and does not provide any information as to the possibility of the appearance of a "big hit." The player therefore easily tires of the conventional simple reach action, and the game becomes monotonous.

Reliable information relative to the appearance of a "big hit" will not give the player excessive expectation of a "big hit," and the player will not feel betrayed when a "loss" is definitely determined. If the information indicative of the probability of a "big hit" is not only simple information, but also an interesting and effective demonstration with variety, it would enhance the player's interest in the entire game.

SUMMARY OF THE INVENTION

An object of the present invention is to provide a gaming machine that can provide to a player an indication of the likelihood of a "big hit" by an indicated plurality of symbols, each symbol representing a different likelihood, or probability, for the "big hit," and wherein the likelihood thus informed to the player is changeable in response to an indicated combination of the symbols.

In accordance with a first embodiment of the present invention, there is provided a gaming machine having a symbol display arrangement for displaying a variable plurality of symbols that are necessary for playing a game. A predictive display arrangement is provided for performing a predictive display that informs the player of the likelihood of the appearance of a specific symbol display state upon the stopping of the variation action of the symbols that are displayed by the symbol display arrangement. Additionally, a controller determines whether or not the symbol variation action that has been started in response to the satisfaction of a preset condition is to be stopped with the appearance on the symbol display arrangement of the specific symbol display state. The controller determines which of at least one predictive display mode from among a plurality of predetermined predictive display modes is to be displayed to the player. Moreover, the controller controls the predictive display arrangement so that the probability, or likelihood, of the appearance of the specific symbol display state is changeable in conjunction with a change in the game responsive to the passage of time.

In a first embodiment, the controller controls the predictive display arrangement so that the probability of the appearance of a specific symbol display state is changeable in conjunction with the change in the game with the passage of time. The player will expect the appearance of the predictive display having a high likelihood, and therefore the player's expectation of the appearance of the specific symbol display state, illustratively a "big hit," can be sustained from the start of the variation display to the stopping thereof The player's expectation for the "big hit" is enhanced over time by changing the predictive display in which the likelihood of the "big hit" is increased with time.

In a second embodiment of the present invention, there is provided a gaming machine having a symbol display arrangement for displaying a varying plurality of symbols necessary for a game, a predictive display arrangement for performing a first predictive display reflecting a first likelihood of the appearance of a specific symbol display state on the stopping of the variation action of the symbols displayed by the symbol display arrangement, and a second predictive display reflecting a second likelihood of the appearance of the specific symbol display state upon satisfaction of a predetermined condition. The gaming machine is additionally provided with a controller for determining whether or not the variation action is to be stopped showing the specific symbol display state and selecting a predictive display mode from among a plurality of predetermined first predictive display modes, and selecting a predictive display mode from among a plurality of predetermined second predictive display modes, the controller being arranged to control the predictive display arrangement so that the likelihood of appearance of the specific symbol display state by the second predictive display is changeable in conjunction with a change in the game resulting from the passage of time.

In the second embodiment, the controller controls the predictive display arrangement to display a first predictive display and a second predictive display accompanied with a change in the game resulting from the passage of time. The first predictive display reflects a first likelihood of the appearance of the specific symbol display state and the second predictive display reflects a second likelihood of the appearance of the specific symbol display state when a predetermined condition has been satisfied. The second predictive display is arranged to display a change in the likelihood of the appearance of the specific symbol display state. Therefore, the player's expectation of a "big hit" can be changed with the passage of time during the game. The predetermined condition mentioned above is a condition where reach state is to be realized. Thus, if the second predictive display is executed, the player can recognize that a "reach" state may be established with a likelihood corresponding to the display mode of the second predictive display. Moreover, if the first predictive display is arranged to be a demonstration display in the "reach state" the player's expectation for the "big hit" may be enhanced, thereby achieving variety and greater interest in the game on the part of the player.

In accordance with a third embodiment of the present invention, there is provided a gaming machine having a symbol display arrangement for displaying a varying plurality of symbols necessary for a game, a predictive display arrangement for performing a first predictive display reflecting a first likelihood of the appearance of a specific symbol display state on the stopping of the variation action of the symbols displayed by the symbol display arrangement, and a second predictive display reflecting a second likelihood of the appearance of the specific symbol display state when a predetermined condition has been satisfied. A controller is provided for determining whether or not the variation action started by satisfying a preset condition is stopped showing the specific symbol display state, for selecting a predictive display mode from among a plurality of predetermined first predictive display modes, and for selecting a predictive display mode from among a plurality of second predetermined predictive display modes. The controller is arranged to control the predictive display arrangement to perform the first predictive display after performance of the second predictive display, the first and second predictive displays having associated therewith respective probabilities predictive of the appearance of the specific symbol display state, at least one of the probabilities being changeable in conjunction with a change in the game resulting from the passage of time.

In the third embodiment, the controller is arranged to control the predictive display arrangement to perform the first predictive display after the performance of the second predictive display. Also, at least one of the probabilities for the appearance of the specific symbol display state that is predicted by the second predictive display and by the first predictive display, can be changed with the passage of time. Therefore, the player can easily recognize the time-dependent change of the likelihood, for example, by displaying the performance of the second predictive display and subsequently performing the first predictive display when the symbol variation display has come into the "reach state."

In accordance with a fourth embodiment of the present invention, there is provided a gaming machine in which the likelihood of a "big hit" is changeable by displaying a plurality of predictive display symbols sequentially with the passage of time. That is, the likelihood of the appearance of the specific symbol display state is changeable by displaying a plurality of predictive display symbols sequentially. Therefore, the player easily can recognize the time-dependent change of the likelihood.

In accordance with a fifth embodiment of the present invention, there is provided a gaming machine in which the plurality of predictive display symbols are displayed successively. Plural predictive display symbols are successively displayed. Accordingly, smaller changes in the likelihood of the appearance of the specific symbol display state can be indicated to the player by the successively displayed symbols.

In accordance with a sixth embodiment of the present invention, there is provided a gaming machine in which a combination of the plurality of predictive display symbols being displayed sequentially depicts a story line. The change of the predictive display symbols, which is accompanied with the change of the likelihood, is arranged to depict a story line. Accordingly, the interest of the player for the predictive display is enhanced, consequently enhancing the player's interest in the entire game.

In accordance with a seventh embodiment of the present invention, there is provided a gaming machine in which the controller is provided with a predictive display memory for storing a plurality of predictive display symbol groups, each having the plurality of predictive display symbols, by classifying them in accordance with the likelihood thereof. The controller is provided with a predictive display memory for storing a plurality of predictive display symbol groups, each having the plurality of predictive display symbols, by classifying them in accordance with the likelihood thereof The predictive display can be performed in various display modes, which can correspond to the same degree of probability, so that the player will not easily tire of the symbol variation from start to stop. Moreover, the player's interest in the game is enhanced by enabling him or her to estimate the quantum of the likelihood of the "big hit" that is associated with the displayed predictive display.

In accordance with an eighth embodiment of the present invention, there is provided a gaming machine in which the probability, or likelihood, of the "big hit" is arranged to be changeable in response to the stop timing of the variation action of the symbols being displayed by the symbol display arrangement. The likelihood of the appearance of the specific symbol display state is changeable in response to the stop timing of the variation action of the symbols being displayed by the symbol display arrangement. Accordingly, a sense of relationship between the stop display and the predictive display can be imparted to the player. The player easily recognizes the predictive display by paying attention to the stop display of the variation action.

The player who is aware of relation between the stop timing of the variation of the displayed symbols and the timing of the change of the probability, will pay attention to what is displayed in response to each timing. Accordingly, an effect is available to increase the player's expectation of the "big hit" in response to the stop timing of the variations of displayed symbols.

Recently, pachinko game machines, so-called "variable probability machines" and "variation time shortening machines" have become popular and have increased their award ratios. The variable probability machine is provided with a variable display that performs a bonus game, a so-called "variable probability game," in which the likelihood of the "big hit" is increased during subsequent games to a game that results in the "big hit" associated with a special pattern. The variation time shortening machine is provided with a variable display that is arranged to perform a bonus game, a so-called "time shortening game," in which the time of symbol variation is shortened during subsequent games to a game that results in the "big hit," also associated with a special pattern. In such gaming machines, it is a significant problem for the player whether he or she can play such a bonus game after the appearance of the "big hit."

Usually, the transfer to a bonus game is principally established by determining whether or not the displayed stop symbols corresponds to a predetermined combination of symbols among combinations of symbols previously determined to be associated with the "big hit," i. e., the "big hit" symbols or the "big hit" pattern. For example, in the case where the displayed stop symbols correspond to a combination of "3-3-3," "5-5-5," or "7-7-7," which are among the combinations that are associated with the "big hit," the game is transferred into a bonus game. Therefore, the player who expects that such a combination may appear on the stopping of the symbol variation tends to pay attention to the stop display during an ordinary game condition.

In accordance with a ninth embodiment of the present invention, there is provided a gaming machine in which the predictive display is arranged to be performed one or more times until the variation action of any one of the symbols is stopped.

In the case where the predictive display is arranged to predict a stop mode of the symbol variation, the procedure of the game is arranged in the order of "start of all symbol variations" "predictive display"→"stop of one of the symbol variations." The player may have an expectation as to whether the predictive display will lead to a "big hit," and subsequently will have the additional expectation as to whether the stopped symbols will correspond to the symbols for transferring to a variable probability game or the time shorting game. Thus, the fin of the game is further enhanced.

In particular, in the case where three variable symbols are arranged to be displayed, and the variations of the three variable symbols are arranged to stop at different times, the second stop symbol is used to determine whether or not the "reach" state is established, and therefore the player is concerned about the second stop symbol. In the present invention, the likelihood indicated by the predictive display may sometimes include two kinds. First, there is the probability or likelihood of development into the "big hit" depending upon whether or not the symbol variations are stopped in the specific stop state. Second, the probability or likelihood of development into a "reach" state in which the "big hit" will be established if one more specific symbols are displayed upon the stopping of the variation.

In accordance with a tenth embodiment of the present invention, there is provided a gaming machine in which the predictive display is arranged to be performed one or more times until the variation action of any two of the symbols is stopped one after the other.

In the case where the predictive display is arranged to predict a stop mode of the symbol variation, if the procedure of the game is arranged in the order of "start of all symbol variations"→"stop of a first one of the symbol variations"→"predictive display"→"stop of a second one of the symbol variations," the player can understand a process in which he is advised whether or not the reach is actually established after he or she doubted whether the predictive display would be connected to reach state, thereby increasing the player's interest in finding a relationship between the predictive display and development into the "reach" state. In other words, what kind of predictive display needs to be executed for development of the game into the "reach" state. In addition, when the player recognizes the predictive display that tends to develop into the "reach state" the player then pays attention to the subsequent course of the game with an expectation that the possibility of development into a "reach state" will be high because the particular predictive display was executed. This expectation is established to a predeterminable certainty, and hence the player's interest in the game is enhanced.

In accordance with an eleventh embodiment, there is provided a gaming machine in which the predictive display is arranged to be performed one or more times until the variation action of any three of the symbols is stopped one after another.

In a case where three variable symbols are arranged to be displayed and two symbols among them have already stopped to establish a "reach" state, the third (last) stop symbol fills the role of determining whether or not the "big hit" is established. By executing a predictive display to indicate likelihood of development into the "big hit" during a "reach" state the player's interest is increased by finding a relation between the predictive display and the development into the "big hit." When a known predictive display is performed, the player will pay attention to the game with an expectation that is supported by a predetermined certainty in the appearance of the "big hit."

In accordance with a twelfth embodiment, there is provided a gaming machine in which the predictive display is arranged to be performed one or more times until the variation action of any one of the symbols is stopped as well as one or more times until the variation action of any two of the symbols is stopped one after the other.

In accordance with a thirteenth embodiment, there is provided a gaming machine in which the predictive display is arranged to be performed one or more times until the variation action of any one of the symbols is stopped as well as one or more times the variation action of any three of the symbols is sequentially stopped.

In accordance with a fourteenth embodiment, there is provided a gaming machine in which the predictive display is arranged to be performed one or more times until the variation actions of any two of the symbols is stopped one after the other as well as one or more times until the variation action of three of the symbols is sequentially stopped.

In accordance with a fifteenth embodiment, there is provided a gaming machine in which the predictive display is arranged to be performed one or more times until the variation action of any one of the symbols is stopped, further one or more times until the variation action of two of the symbols is stopped one after another, and further one or more times until the variation action of three of the symbols is sequentially stopped.

BRIEF DESCRIPTION OF THE DRAWING

The foregoing and other objects, features, and advantages of the invention will become more apparent from the following detailed description taken in conjunction with the accompanying drawings, in which:

FIG. 3 is a table for determination of prognostic facial expressions;

FIG. 8 is a table showing ranges of random numbers to be extracted;

FIG. 9 is a table for the determination of a "big hit" correlated to random number ranges;

FIG. 10 is a table for the determination of the "big hit" symbol correlated to random numbers;

FIG. 11 is a table for the determination of the various stop symbols correlated to random numbers;

FIG. 12 is a table for the determination of "reach" demonstration for the "big hit" correlated to random numbers;

FIG. 13 is a table for the determination of "reach" demonstration for "loss" correlated to random numbers;

FIG. 35 is table B for the prognostic display determination, correlated to random number ranges;

FIG. 38 is a table showing an appearance probability for the "big hit" when the "big hit" determination results in the "big hit;"

FIG. 39 is a table showing an appearance probability for the "loss" when the "big hit" determination results in a "loss;"

FIG. 40 is a tabular representation that illustrates the probability of development into the "big hit;"

FIG. 41 is a tabular representation that illustrates the probability of development into a "reach;"

FIG. 45 is a tabular representation of a further example showing the ranges of random number to be extracted;

FIG. 46 is a tabular representation for the determination of a prognostic facial expression combination to be referred to in the event of the "big hit +clapping reach;"

FIG. 47 is a tabular representation for the determination of a prognostic facial expression combination to be referred to in the event of the "big hit+Harite reach;"

FIG. 48 is a tabular representation for the determination of a prognostic facial expression combination to be referred to in the event of the "big hit+all rotation reach;"

FIG. 49 is a tabular representation for the determination of a prognostic facial expression combination to be referred to in the event of the "loss+clapping reach;"

FIG. 50 is a tabular representation for the determination of a prognostic facial expression combination to be referred to in the event of the "loss+Harite reach;"

FIG. 51 is a tabular representation for the determination of a prognostic facial expression combination to be referred to in the event of the "loss+no reach;" and FIG. 52 is a tabular representation for the determination of a facial expression symbol.

DETAILED DESCRIPTION

A pachinko game machine will be described herein as a specific illustrative embodiment of the invention.

Figure 1:
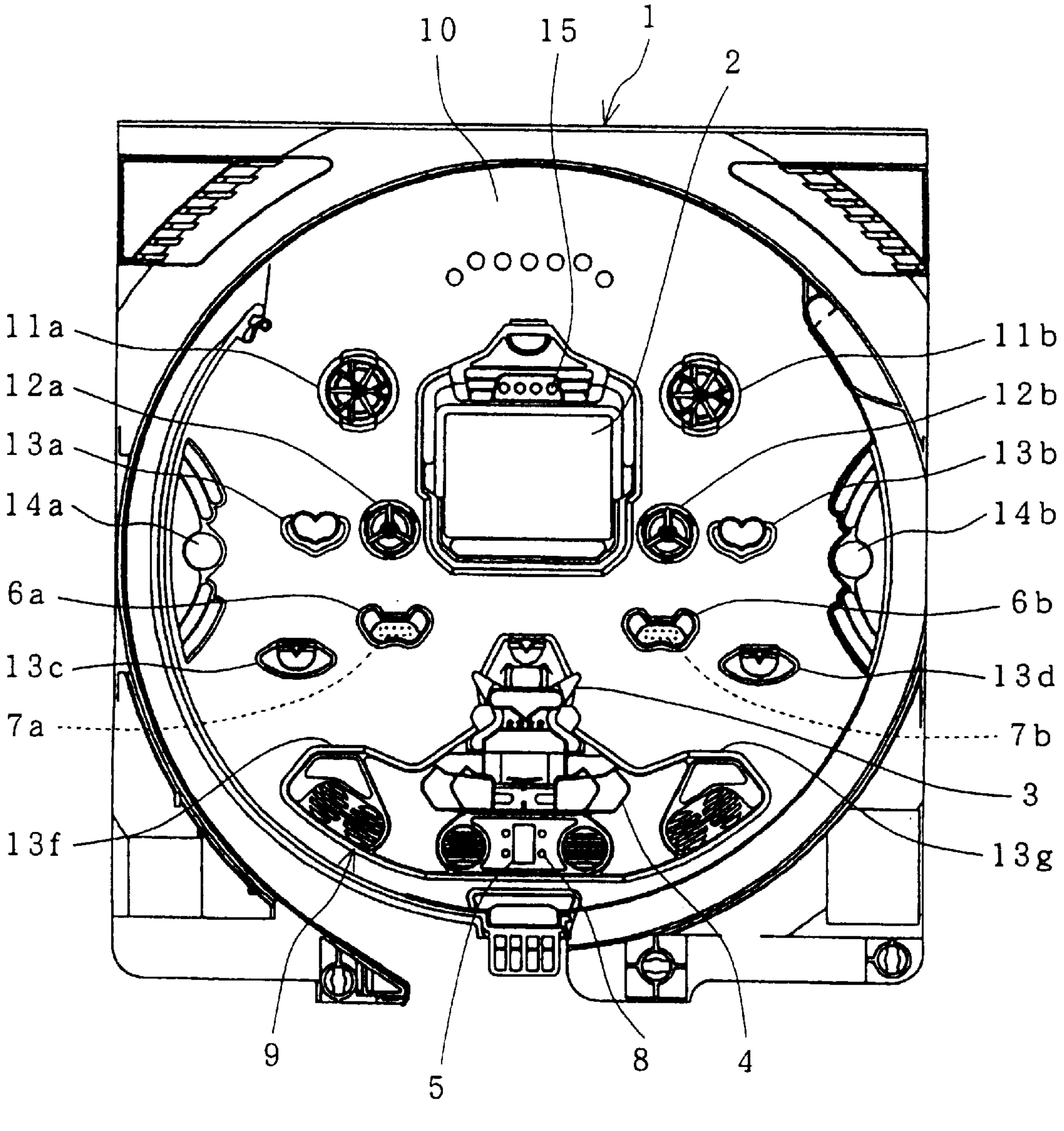
FIG. 1 is a representation of a front view of a specific illustrative embodiment of the present invention in the form of a pachinko game machine.

FIG. 1 is a front view representation of a pachinko game machine 1, showing a game board face 10 . A liquid crystal display 2 functions as a symbol display arrangement and is substantially centrally disposed on game board face 10.

Figure 2:
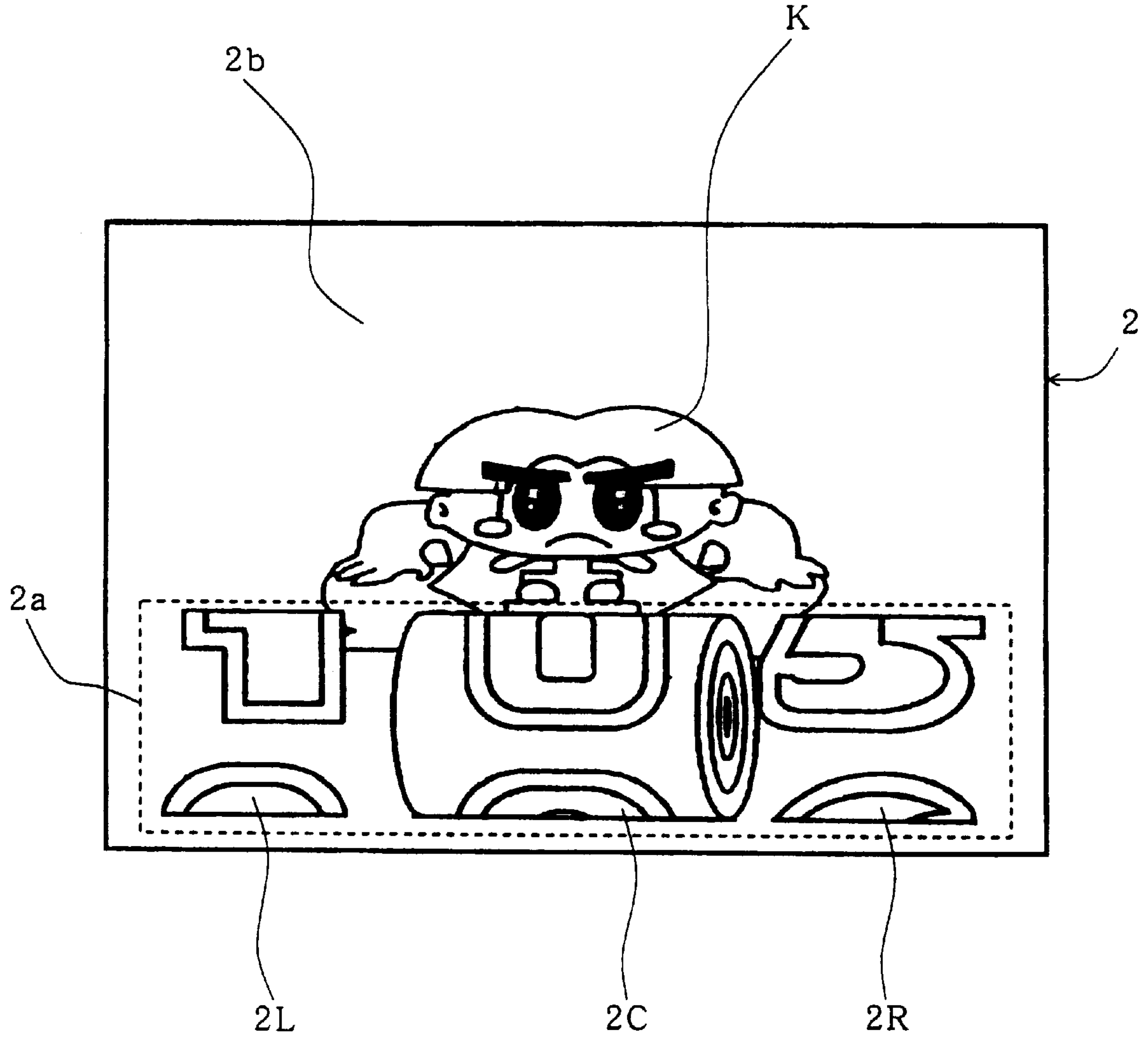
FIG. 2 is a representation of a front view of a liquid crystal display.

FIG. 2 is a front view of liquid crystal display 2. As shown in FIG. 2, liquid crystal display 2 is divided into a symbol variation display portion 2*a* and a predictive display portion 2*b*. Symbol variation display portion 2*a* is arranged to display a varying plurality of symbols in a manner that simulates three rows of the rotatable reels of a slot machine (not shown). Predictive display portion 2*b* is arranged to display a first predictive display, such as a "reach demonstration," that reflects the likelihood of the appearance of a specific symbol display state or a special pattern associated with a "big hit," that might be achieved when the variation of a further symbol is stopped. The "big hit" would be profitable to the player. Predictive display portion 2*b* is additionally arranged to display a second predictive display, termed a "prognostic display," that serves to predict the likelihood of the appearance of the "big hit" under a predetermined condition, such as after a "reach state" has been established. In the description provided hereinafter, the first predictive display is termed the "reach demonstration" and the second predictive display is termed the "prognostic display." The present invention also includes an embodiment in which the first predictive display (i.e., the "reach demonstration") is not executed.

The "reach demonstration" reflects the likelihood of the appearance of the specific symbol display state. The "reach demonstration" is executed in each state where, for example, at least one variation display or rotation of at least one reel image is stopped. In a preferred "reach demonstration," the rotations of two reel images are stopped, each displaying the same symbol, and the remaining reel image continues to rotate. The "reach demonstration" may be performed by utilizing any of a variety of image display techniques, such as vibration or swing of the stopped reels, change of the background image, and/or rotation of all the three reels while each displays the same symbol arranged in-line. Such a "reach demonstration" is termed an "all rotation reach." The display modes of the "reach demonstration" are responsive to the likelihood of the appearance of their respectively associated symbol display states.

In this embodiment, symbol variation display portion 2*a* is provided in a lower portion of the display screen of liquid crystal display 2, and all the remaining display area of the display screen is provided for predictive display portion 2*b*. Practically, as shown in FIG. 2, the "reach demonstration" of the prognostic display is displayed by overlapping with the symbols variably displayed on the display screen of liquid crystal display 2. As stated, the symbol variation display portion 2*a* is arranged to display varying symbols in response to electrical signals, so as to simulate the variable display of symbols on the three rows of the rotatable reels of a slot machine (not shown). In symbol variation display portion 2*a* are displayed three variable symbols, that is, left variable symbol 2L (left symbol), center variable symbol 2C (center symbol), and right variable symbol 2R (right symbol). Predictive display portion 2*b* is arranged to display symbols, animations, and characters. In predictive display portion 2*b* of FIG. 2, a prognostic display symbol "Kintaro," designated in the figure with a "K," is displayed as the prognostic display. Kintaro is a famous boy character in Japan.

This prognostic display is used to predict that a symbol combination corresponding to the "big hit," for example, symbol combination "7-7-7" may appear when the variations of the symbols displayed in symbol variation display portion 2*a* are stopped through a "reach state." In this embodiment, this prognostic display is arranged to have a display mode that changes over time. With the change of the display mode of the prognostic display, the likelihood of reaching the "big hit" may also be changed.

More specifically, after initiation of the variation action of the symbols displayed in symbol variation display portion 2*a*, the prognostic display symbol "Kintaro" K is displayed and the facial expression thereof is changed with the passage of time. This change in the facial expression indicates a change in the likelihood of the "big hit." Therefore, the probability of achieving the "big hit" can be gradually increased or decreased, or changed high or low, by preparing combinations of different prognostic display symbols. In this embodiment, the prognostic display symbol "Kintaro" K is always displayed independently of the variation action in symbol variation display portion 2*a*. When a normal facial expression K1 and facial expressions K2, K3 for the prognostic display modes are provided, the facial expression of "Kintaro" K may be changed by displaying, for example, K1→K2→K3→K1 or K1→K2→K1→K3→K1 sequentially over time during execution of the game. The embodiment mentioned above is realizable by the prior storage in a memory of a plurality of different predictive display symbols, each associated with a different likelihood of the "big hit."

Figure 4:
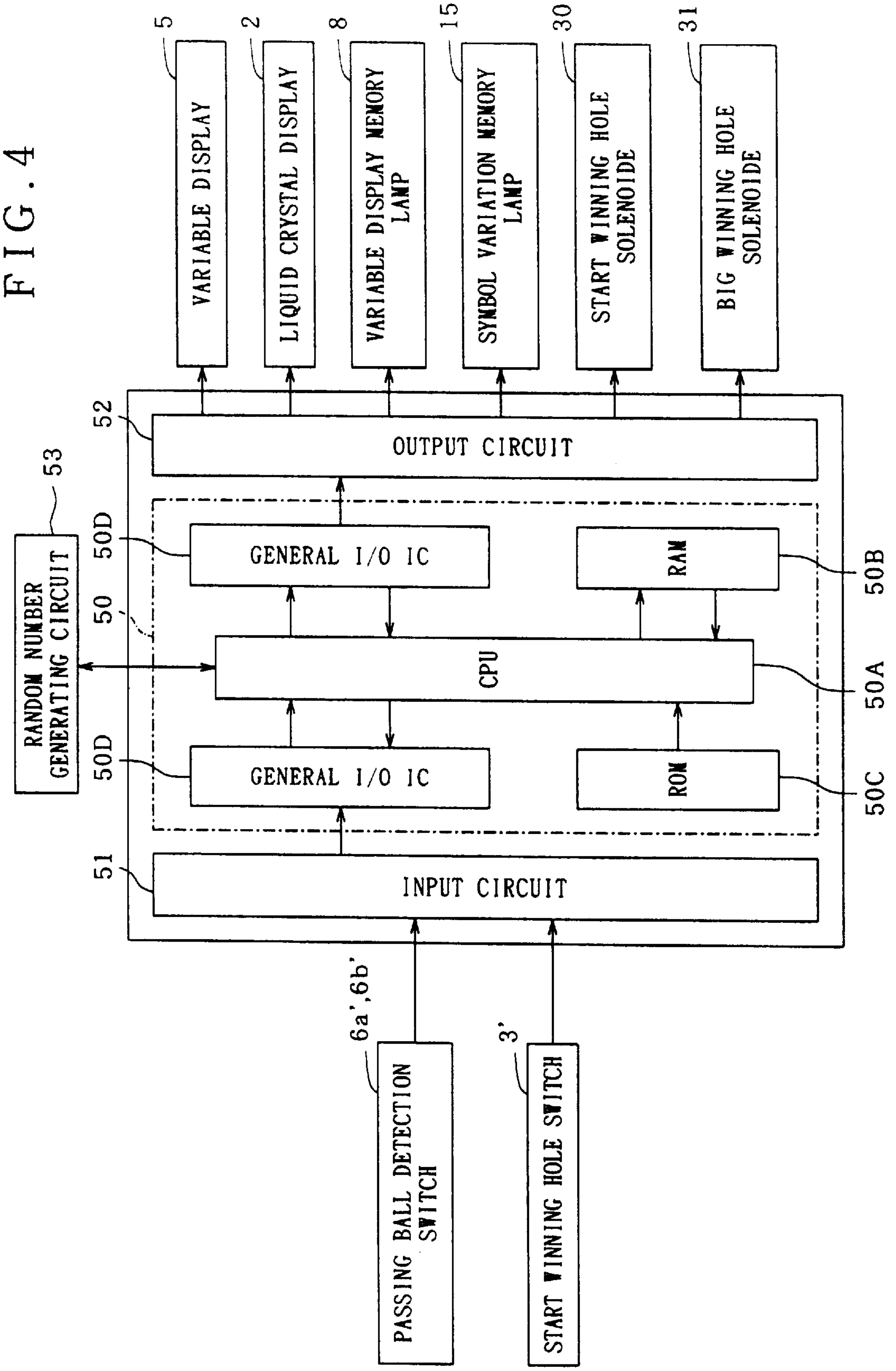
FIG. 4 is a block diagram of circuit portions of the pachinko game machine.

FIG. 4 is a block diagram of electric circuit portions of the pachinko game machine 1, specifically showing a ROM 50C in which is stored information corresponding to the different predictive display symbols. In this specific illustrative embodiment of the invention, the different predictive display symbols are correlated to respective likelihoods of the appearance of the "big hit."

FIG. 3 is a table for prognostic facial expression determination in which a plurality of "Kintaro" symbols to be stored in ROM 50C of FIG. 4 are categorized. The "Kintaro" symbols are categorized into four groups, A, B, C, and D, that are arranged in order of likelihood of the "big hit," and each group contains two "Kintaro" symbols with different facial expressions (face symbols). The face symbol to be displayed as prognostic display (prognostic facial expression) is selected by random number extraction. More specifically, a random number that is used to determine the prognostic facial expression, as will be explained later, is extracted. Possible values of random number are divided into several ranges, each range being associated with one of face symbols. For example, in this specific illustrative embodiment of the invention, the random number range from 0 to 40 is associated with face symbol 1. A determination as to which range of random numbers is appropriate for the extracted random number is made by a CPU50A, shown in FIG. 4. The corresponding face symbol is then selected to be displayed as the prognostic display (prognostic facial expression).

Display device 2 having symbol variation display portion 2*a* and predictive display portion 2*b*, may be an electrical display device formed of a plurality of arranged LEDs, a CRT, a plasma display, an electro-luminescence display, or a liquid crystal display, as previously stated.

As shown in FIG. 1, a start hole 3 is disposed below liquid crystal display 2. The symbol variation displayed in liquid crystal display 2 is started when a playing ball (not shown) enters start hole 3. Start hole 3 constitutes a variable winning device that is convertible between a first condition that is disadvantageous to the player and a second condition that is advantageous to the player. The gaming machine is arranged to payout predetermined numbers of prize balls, illustratively 5 balls, when a playing ball enters start hole 3. A playing ball (not shown) can enter start hole 3 even when the variable winning device is in the first condition disadvantageous to the player, because start hole 3 has sufficient capacity to permit a win even when a playing ball enters during the first condition.

Four symbol variation memory lamps 15 are disposed above liquid crystal display 2. The symbol variation memory lamps memorialize the number of winning times that a playing ball entered start hole 3, which in this specific illustrative embodiment of the invention can be up to four times during symbol variation in symbol variation display portion 2*a*. Symbol variation memory lamps 15 provide real time information of the number of times the symbol variation was successively displayed by liquid crystal display 2 to the player. More than 5 winning times are determined to be ineffective as a starting condition for the symbol variation display.

Below start hole 3 is provided a big-winning hole 4(called an "attacker") that can have a closed condition disadvantageous to the player and an open condition advantageous to the player. Big-winning hole 4 forms a door-type variable winning device, the door having an open condition that is advantageous to the player when the variation action of the symbols displayed in symbol variation display portion 2*a* of liquid crystal display 2 is stopped with a specific symbol combination corresponding to the "big hit" being displayed. A predetermined number of prize balls, for example 15 balls in this embodiment, are paid out when a playing ball enters big-winning hole 4.

A variable display device 5 is disposed in the lower portion of game board face 10. Variable display device 5 is arranged to start the variation display when a playing ball passes through one of variable display actuation gates 6*a* and 6*b* disposed at the left and right sides, respectively, of liquid crystal display 2. When variable display device 5 is stopped while displaying a predetermined specific symbol, start hole 3 is converted into the second condition that is advantageous to the player.

Four variable display memory lamps 8 are disposed around variable display device 5. The variable display memory lamps are arranged to memorialize the number of times (up to four times) that the playing ball (not shown) passes through one of variable display actuation gates 6*a* or 6*b*. Variable display memory lamps 8 provide real time information of the number of times the variation of symbols has successively been displayed by the variable display to the player. Any more times than five are not counted and are ineffective.

The game board face 10 is further provided with windmills 11*a* and 11*b*, each having a lamp with a light emitting portion; normal windmills 12*a* and 12*b*; normal winning holes 13*a*, 13*b*, 13*c*, 13*d*, 13*f*, and 13*g*; and game board side lamps 14*a* and 14*b*. Each time a playing ball enters a normal winning hole, 15 prize balls are paid out.

Variable display device 5, start hole 3, and big-winning hole 4 are integrated together with normal winning holes 13*f* and 13*g* to form, in this embodiment of the invention, a variable winning ball device 9 arranged on game board face 10.

The following is a description of a game control system for the above-described pachinko game machine. The present specific illustrative embodiment of the invention in the form of a pachinko game machine is provided with a microcomputer as a controller, whereby the entire game procedure is controlled. Such control is effected by a microcomputer 50, shown in the block diagram of FIG. 4. Microcomputer 50 consists of a CPU 50A, a RAM 50B, a ROM 50C, and a general-purpose I/O 50D. The microcomputer can process various kinds of input signals from an input circuit 51 in accordance with a program stored in ROM 50C, and issue output signals via an output circuit 52 to any of various drive, as needed.

CPU 50A computes a variety of determination during the progress of the game, such as a determination of the symbol to be displayed when the variation display of symbol variation display portion 2*a* is stopped (hereafter termed the "stop symbol"), as well as determinations of the display modes of the "reach demonstration" and the prognostic display to be displayed. In this embodiment, CPU 50A is connected to a random number generating circuit 53 and extracts a random number generated by the random number generating circuit 53. CPU 50A executes each of the various determinations based on the value of the random number extracted. In addition to the external random number generating circuit, there may be used in certain embodiments the random number generator that may be incorporated in CPU 50A in the form of a random number generator program.

In this embodiment, input circuit 51 is connected to passing ball detection switches 6*a*' and 6*b*' that generate a signal when a playing ball passes through variable display actuation gates 6*a* and 6*b*, and a starting winning switch 3' that generates a signal when a playing ball enters start hole 3. Output circuit 52 is connected to variable display device 5, liquid crystal display 2, variable display memory lamps 8, symbol variation memory lamps 15, a start winning hole solenoid 30 that actuates the conversion of start hole 3, and a big-winning hole solenoid 31 that actuates the conversion of big-winning hole 4, etc.

The procedure for determining the stop symbol that will be displayed on liquid crystal display 2, and the determination of the display mode of the "reach demonstration" or the prognostic display will be described below with reference to the flowcharts of FIGS. 5 to 7, and to a table that shows ranges of random numbers to be extracted, shown in FIG. 8.

When a playing ball enters start hole 3, start winning switch 3' detects the ball and delivers a signal to CPU 50A. The symbol variation action is then started on symbol variation display portion 2*a* on liquid crystal display 2, based on the prior determinations by microcomputer 50 of the stop symbol, and display modes of the "reach demonstration" and of the prognostic display to be displayed on liquid crystal display 2.

FIG. 8 is a table showing the range of random numbers to be extracted. The random numbers generated by random number circuit 53 are supplied to CPU 50A, which extracts a random number for determining the "big hit" in the range from 0 to 255, as shown in FIG. 8 and in FIG. 5 (ST1). CPU 50A additionally extracts random numbers that are used to determine the stop symbol in the range from 0 to 14, which are used for the determination of the three variable symbols to be stopped (ST2) (left variable symbol 2L, center variable symbol 2C, and right variable symbol 2R displayed on symbol variation display portion 2*a* shown in FIG. 2). Then, CPU 50A extracts a random number for determination of the "big hit" symbol in the range from 0 to 14 (ST3) and further extracts a random number for determination of the reach demonstration in the range from 0 to 139 (ST4). CPU 50A further extracts random numbers that are used in the determination of the prognostic display, which is responsive in this embodiment to random numbers in the range from 0 to 139 (ST5). In this embodiment, the prognostic displays are executed twice, and therefore a random number "a" for determination of the first prognostic display and a random number "b" for determination of the second prognostic display are extracted, respectively.

Subsequently, a determination is made whether or not an executed symbol variation action should be stopped at the "big hit." This determination is based on the random number for the "big hit" that was extracted at step ST1, and is made at step (ST6) in FIG. 6.

FIG. 9 is a table for the determination of a "big hit." ROM 50C stores a "big hit" determination table in which the random number ranges have been attributed to the "big hit." In this embodiment, the random number "7" has been predetermined to be the random number which, when extracted, will result in the "big hit." When the determination results in the "big hit" at step ST6, then a procedure is executed at step ST7 to determine the particular "big hit" symbol that is to be displayed as the stop symbol corresponding to the "big hit" when the variation action on symbol variation display portion 2*a* is stopped.

FIG. 10 is a table for the determination of the "big hit" symbol. In the procedure of step ST7, the "big hit" symbols to be displayed are determined from the "big hit" symbol determining table shown in FIG. 10, which are based on the random number that is extracted for in step ST3 (ST7) determination of the big hit symbol extracted. For example, if the extracted random number for determination of big hit symbol is "6," the "big hit" stop symbols are determined to be "7-7-7." Thus, the "big hit" is determined, as are "big hit" symbols. Subsequently, the procedure of step ST12 of FIG. 7 is executed.

In step ST6, when the value extracted for the random number for determination of the big hit is a value other than "7" and consequently is determined to be a "loss" based on the table shown in FIG. 9, the stop symbols displayed on left symbol 2L, center symbol 2C, and right symbol 2R are determined from the stop symbol determination table shown in FIG. 11. The determination is based on the three random numbers for the determination of the stop symbol extracted in step ST2 (ST8), discussed hereinabove. It is then determined whether the stop symbols of left symbol 2L and right symbol 2R are or are not to be the same symbol (ST9). When the two symbols are different, the procedure of step ST13 shown in FIG. 7 is executed, since any "reach demonstration" is no longer necessary. However, when the two symbols are same, it is then determined whether center symbol 2C will be the same as the other two symbols (ST10). If center symbol 2C is determined to be different from the other two symbols, the procedure of ST12 shown in FIG. 7 is executed. If all three symbols are determined to be the same, which rarely happens, the symbol that is determined for center symbol 2C is changed to the subsequent symbol of the stop symbol determination table shown in FIG. 11 (ST11) so as not to display three identical symbols as stop symbols that would be associated with "big hit" symbols, because a determination of "loss" has already been established in step ST6.

Figure 7:
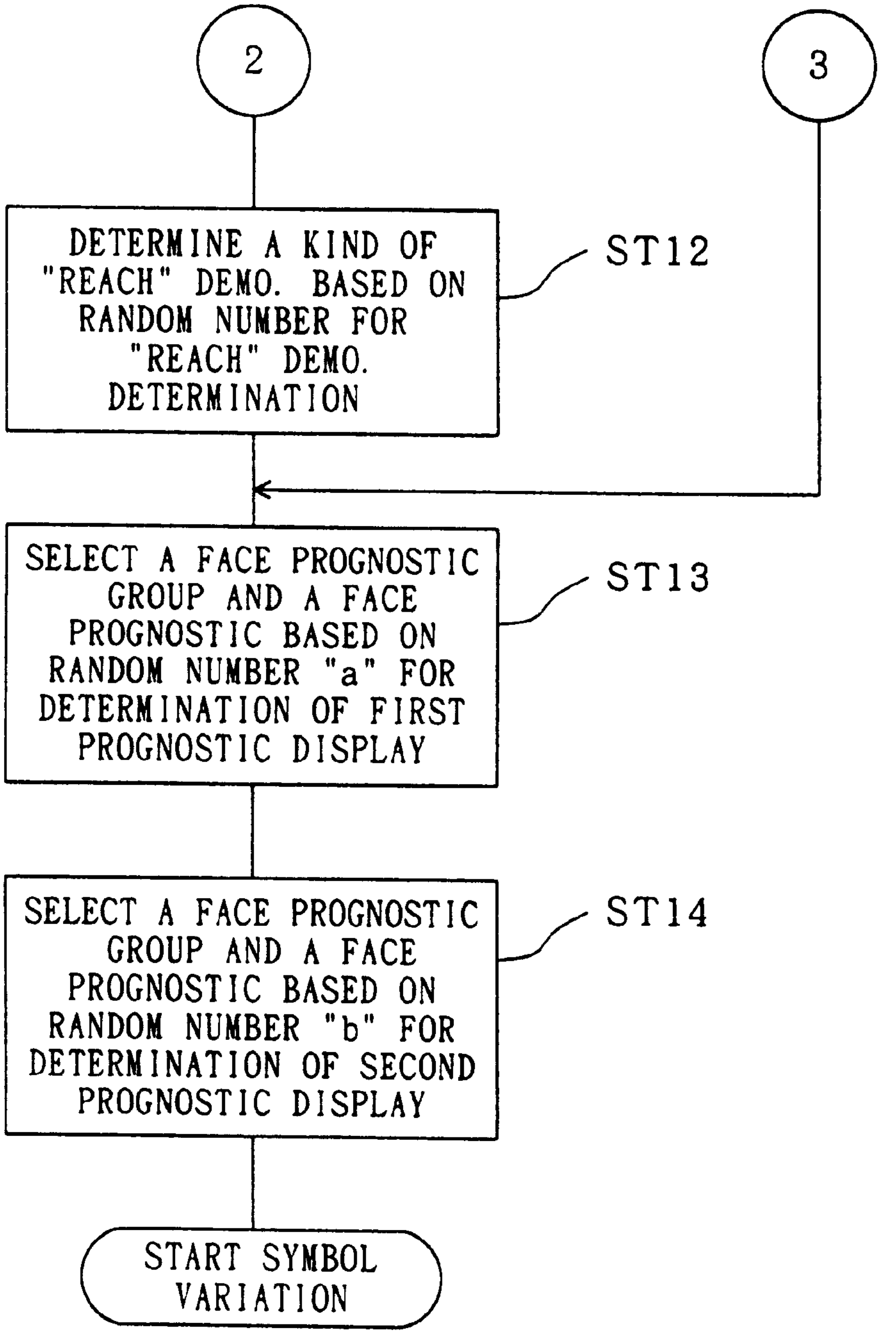
FIG. 7 is a continuation of the flowchart of FIGS. 5 and 6;.

After the stop symbols to be displayed in symbol variation display portion 2*a* are determined, the procedure of step ST12 shown in FIG. 7 is executed. First, the type or kind of the "reach demonstration" to be displayed is determined based on the random number for the determination of the reach demonstration is extracted in the procedure of step ST4. If the "big hit" has been determined in the above-mentioned procedure, the "table for the determination of reach demonstration for big hit" shown in FIG. 12 is selected.

The "reach demonstration" to be displayed is determined in this embodiment by selecting "clapping reach" when the value of the random number extracted for the "reach demonstration" is in the range of from 0 to 24; "Harite reach" is selected when the value is in the range of from 25 to 64; and "all rotation reach" is selected when the value is in the range of from 65 to 139.

If a "loss" has been determined in the above-mentioned procedure, the "table for the determination of reach demonstration for loss" shown in FIG. 13 is selected. The "reach demonstration" to be displayed is determined by selecting "clapping reach" when the value of the random number extracted for the "reach demonstration" is in the range of from 0 to 4; "Harite reach" is selected when the value is in the range of from 5 to 8; and "no reach" is selected when the value is in the range of from 9 to 139. Each "reach demonstration" will be described in detail hereinafter.

In step ST13, a prognostic display that is to be displayed first (termed the "first prognostic display") is determined from "prognostic display determination table A" (FIG. 14) based on the random number "a" for the first prognostic display determination. Also, a prognostic display that is second to be displayed (termed the "second prognostic display") is determined based on the random number "b" for the second prognostic display determination. After these determinations have been made, pachinko game machine 1 will start the variation action of the symbols on liquid crystal display 2. This action will be described hereinafter with referring to FIGS. 36 and 37.

Figure 14:
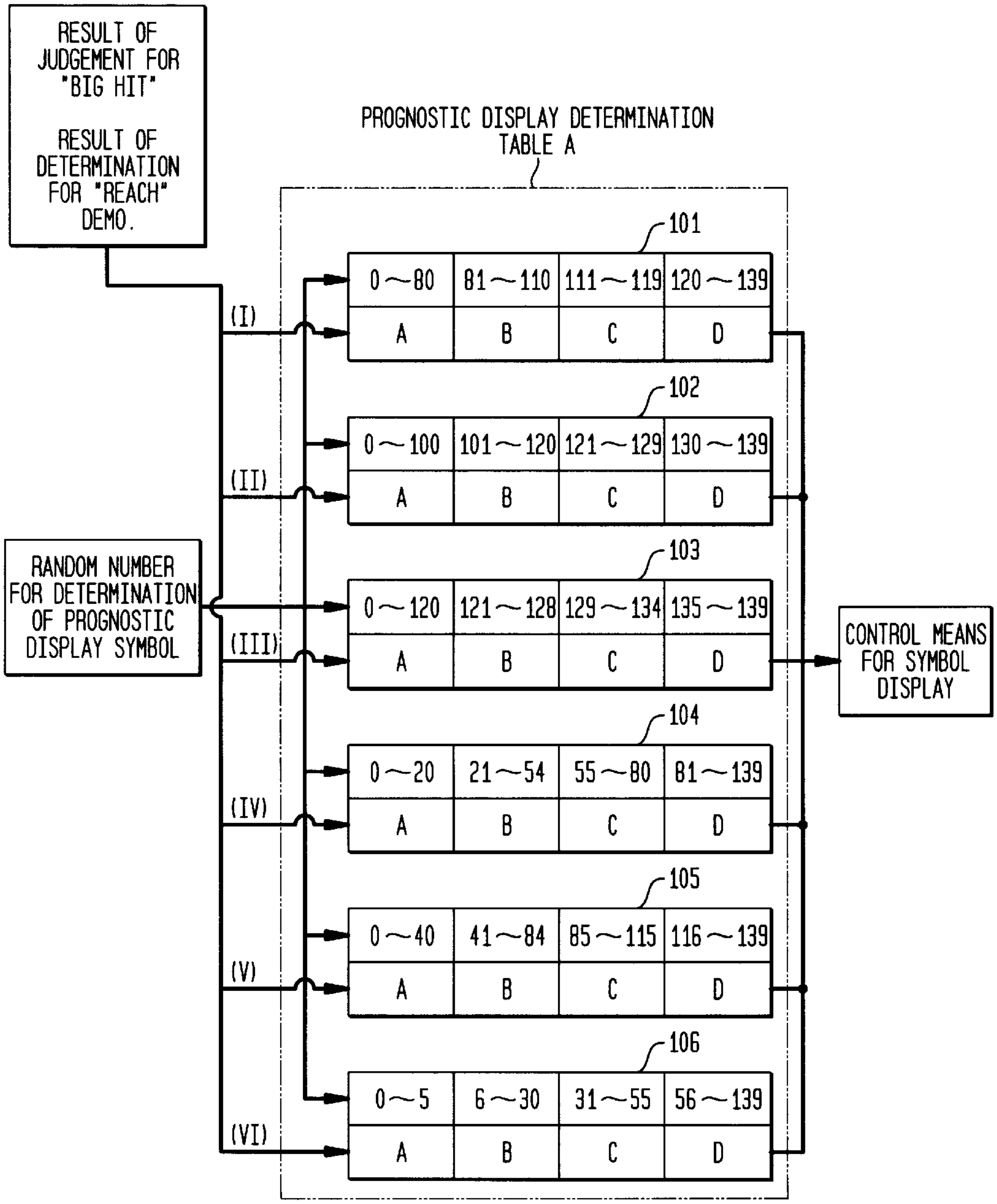
FIG. 14 is a table for the determination of prognostic displays correlated to random number ranges.

FIG. 14 illustrates a determination procedure for the prognostic display using the "prognostic display determination table A," referenced hereinabove in connection with previous steps ST13 and ST14 (FIG. 7). The "prognostic display determination table A" contains six prognostic facial expression determination tables (I to VI in FIG. 14). These include a "first prognostic facial expression" determination table 101, a "second prognostic facial expression" determination table 102, a third prognostic facial expression determining table 103, a fourth prognostic facial expression determination table 104, a fifth prognostic facial expression determination table 105, and a sixth prognostic facial expression determination table 106.

The prognostic facial expression determination table shown in FIG. 3 corresponds to the "first prognostic facial expression" determination table 101. More specifically, A, B, C and D in the "first prognostic facial expression" determination table 101 of FIG. 14 are identical to A group, B group, C group and D group in the table of FIG. 3, respectively. In addition, each random number range attributed to each group is further divided, whereby the prognostic display symbol is associated with a respective further division of the predetermined random number range. In the example shown in FIG. 3, each random number range is divided into two ranges such that the range of 0 to 80 is divided into two ranges of 0 to 40 and 41 to 80; the range of 81 to 110 is divided into two ranges of 81 to 96 and 97 to 110; the range 111 to 119 is divided into two ranges of 111 to 115 and 116 to 119; and the range of 120 to 139 is divided into two ranges of 120 to 129 and 130 to 139. Face symbols of "Kintaro" with different facial expressions as the prognostic display are associated with the divided random number value ranges, respectively.

Figure 6:
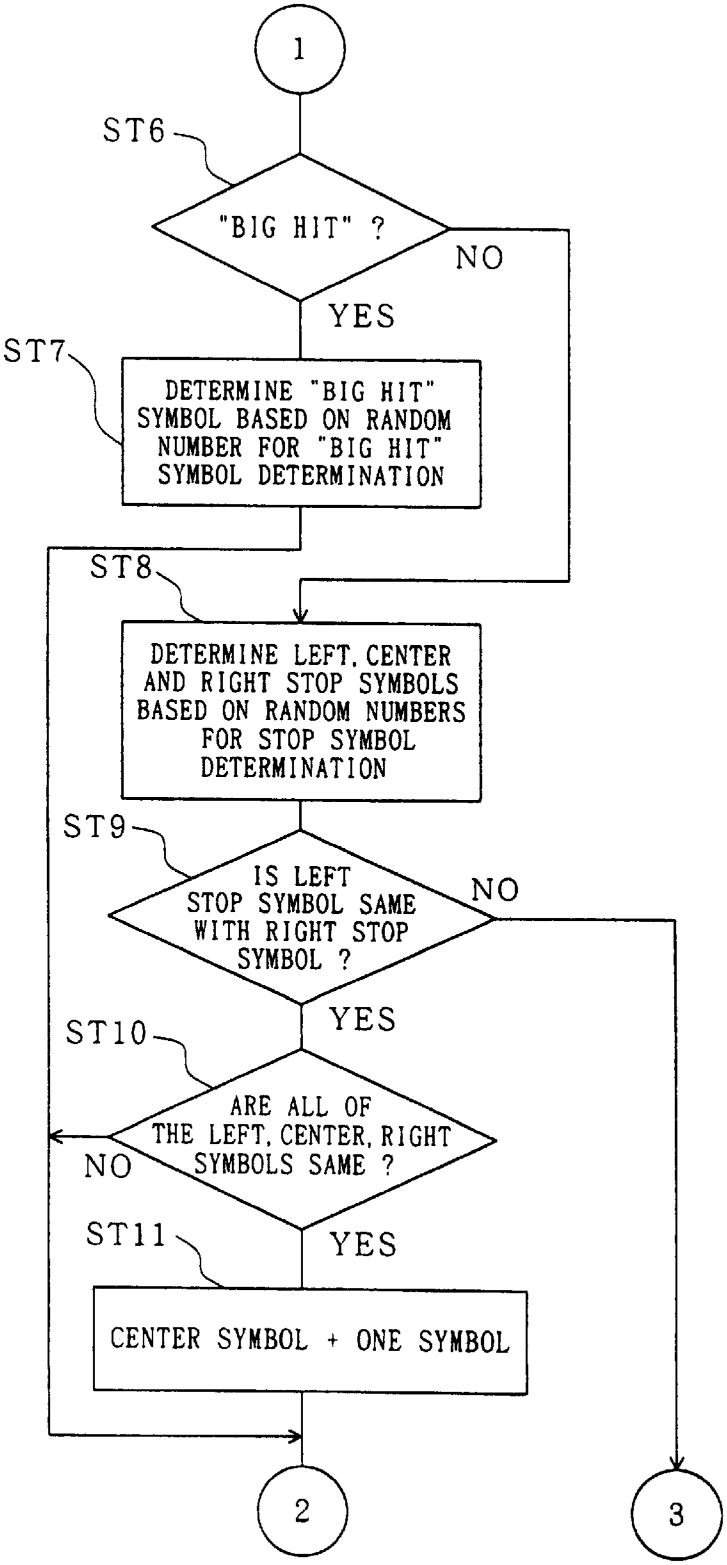
FIG. 6 is a continuation of the flowchart of FIG. 5.

The selection of a particular prognostic facial expression determination table from the above six prognostic facial expression determination tables is executed based on the result of the determination whether or not there will be a "big hit" in step ST6 of FIG. 6, together with the result of the determination of the "reach demonstration" in step ST12 of FIG. 7. When the combination of the results of the determination whether or not there will be a "big hit" and the determination of the "reach demonstration" corresponds to (I) "big hit+clapping reach" the "first prognostic facial expression" determination table 101 is used; when the above combination corresponds to (II) "big hit+Harite reach" the "second prognostic facial expression" determination table 102 is used; when the above combination corresponds to (III) "big hit+all rotation reach" the third prognostic facial expression determination table 103 is used; when the above combination corresponds to (IV) "loss+clapping reach" the fourth prognostic facial expression determination table 104 is used; when the above combination corresponds to (V) "loss+Harite reach" the fifth prognostic facial expression determination table 105 is used; and when the above combination corresponds to (VI) "loss+no reach" the sixth prognostic facial expression determination table 106 is used.

As can be seen from the random number value range of FIG. 14, when the determination of the "big hit" results in the "big hit" (i.e., the aforementioned (I) to (III)), the range of random number values of the A group is arranged to be broad in this embodiment, and therefore the frequency of displaying the face symbols of the A group is high. Accordingly, if the face symbol belonging to the A group is displayed, the player will easily recognize the high likelihood of the "big hit." Alternatively, when the determination of whether or not there will be a "big hit" results in "loss" (i.e., the aforementioned (IV) to (VI)) the random number value range of the D group, which in this embodiment is arranged broad, results in the frequency of displaying the face symbols belonging to the D group to be high. Accordingly, if the face symbol belonging to the D group is displayed, the player will easily recognize the low likelihood of the "big hit." As shown in FIG. 3, the "Kintaro" symbols having a "laughing facial expression" are associated with the face symbols belonging to the A group. Since the "big hit" corresponds to a winning mode that gives a large award to the player, the "laughing facial expression" reflects the player's joyous feeling when the "big hit" appears, and is effective for the player to recognize easily a high likelihood of the appearance of the "big hit."

On the other hand, the "Kintaro" symbols having a crying facial expression are associated with the face symbols belonging to the D group. The crying expression reflect's the player's joyless feeling when the "big hit" does not appear, and is effective for the player to recognize easily a low likelihood of the appearance of the "big hit."

The "Kintaro" symbols having unmanly facial expressions and ordinary facial expressions are associated with the face symbols belonging to the B and C groups, respectively. These symbols do not readily reflect to the player any prediction of a "big hit" or "loss." However, when the above facial expressions are displayed in combination with a facial expression of the A group or t of he D group, the player may deduce predictive information therefrom as to the likelihood of the "big hit." Moreover, a change in the perceived likelihood of the "big hit" will increase the player's interest in the game.

Figure 15:
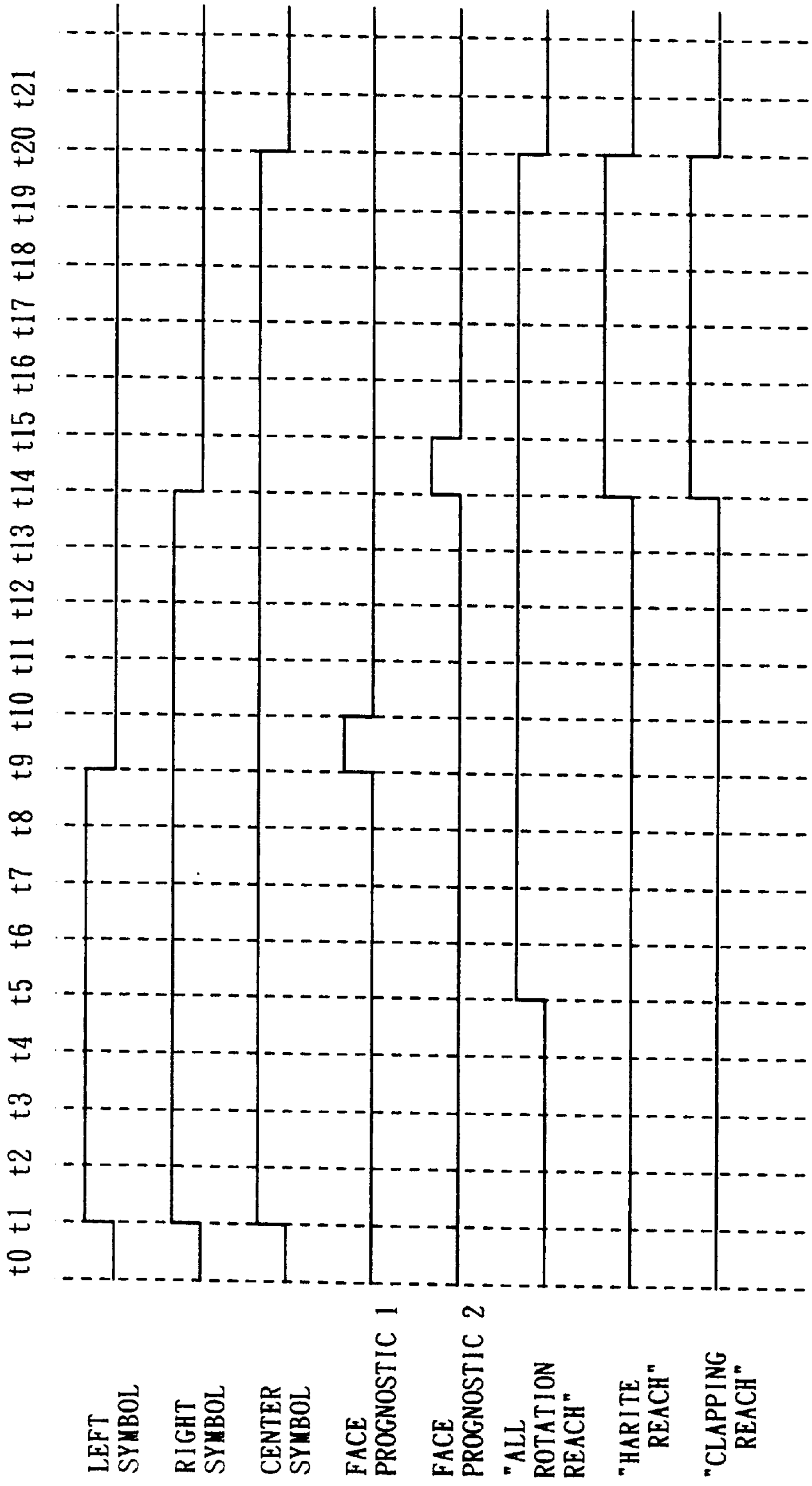
FIG. 15 is a graphical representation of a timing diagram of an example of display duration for variation of symbols, prognostic displays, and "reach" demonstration.

FIG. 15 shows an illustrative graphical representation of a timing diagram of the display timing for the prognostic display performed by the changing facial expression of "Kintaro" mentioned above.

Hereinafter, the first prognostic display of the facial expression of "Kintaro," that is, the first prognostic display mentioned above, is termed "prognostic facial expression 1," and the prognostic display wherein the facial expression of "Kintaro" is changed, that is, the second prognostic display mentioned above, is termed "prognostic facial expression 2."

The variable symbols displayed in symbol variation display portion 2*a* consist of three symbols, specifically left symbol 2L, center symbol 2C, and right symbol 2R, as shown FIG. 2. "Prognostic facial expression 1" is displayed, in this embodiment, when the variation of left symbol 2L is stopped (t9), and "prognostic facial expression 2" is displayed when the variation of right symbol 2R is stopped (t14).

Figure 16:
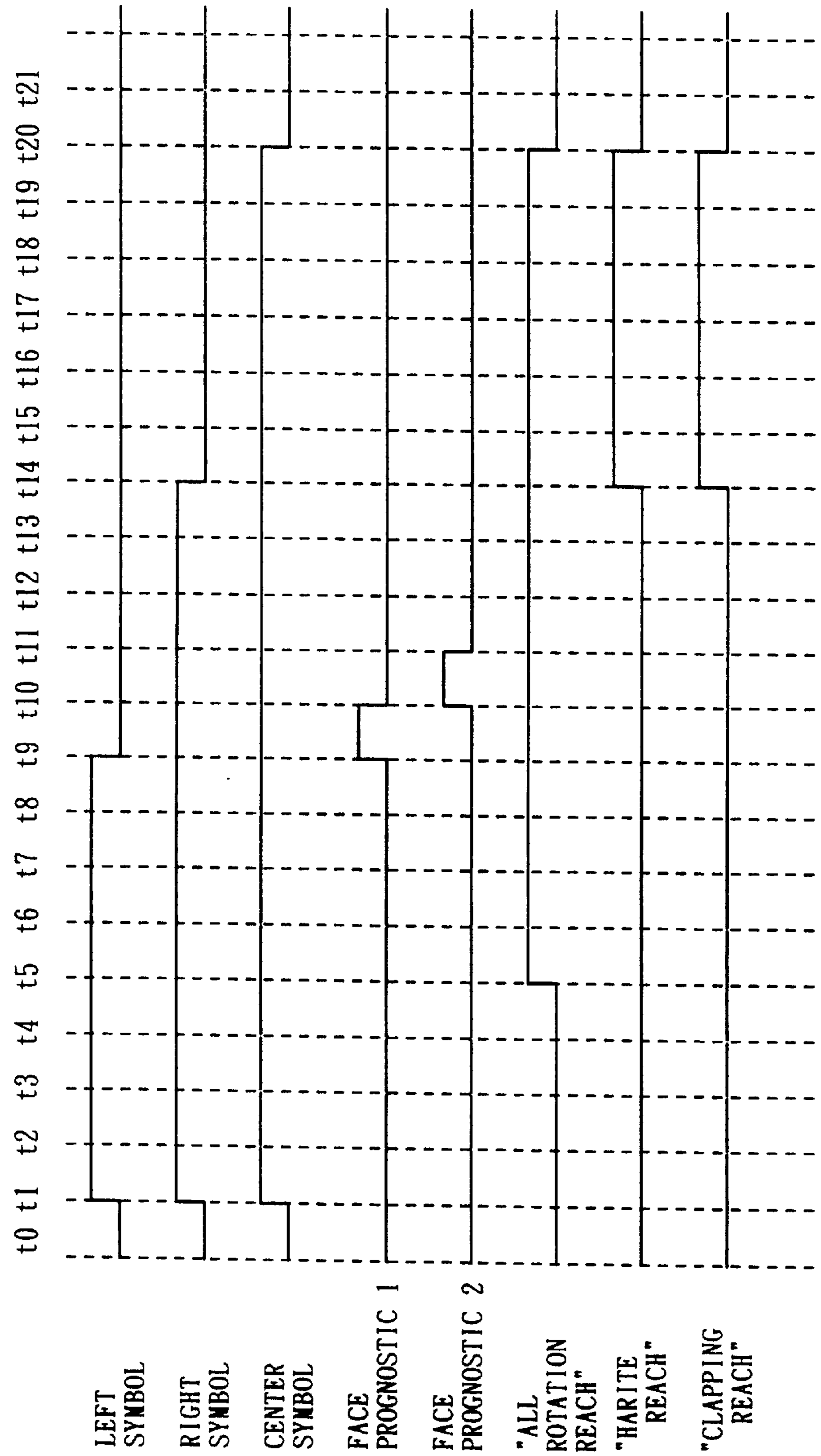
FIG. 16 is a graphical representation of a timing diagram of another example of display duration for variation of symbols, prognostic displays, and "reach" demonstration.

Alternatively, as shown in the timing diagram of FIG. 16, a plurality of the prognostic display symbols may sequentially be displayed until the variation of the symbols is stopped. In FIG. 16, "prognostic facial expression 1" and "prognostic facial expression 2" are sequentially displayed during the period after variation of the left symbol 2L is stopped and until the variation of right symbol 2R is stopped next (i.e., from t9 to t14).

Although the display of the prognostic display symbol is to be execute synchronously with the stopping of the variation of each symbol, the display timing of the prognostic display symbols is not limited thereto.

Embodiments (1) to (7) of the display timing of the prognostic display symbols will be described below. These embodiments are grounded in the point of view that the prediction display is provided for predicting a specific symbol display state that will be caused to appear when the variation of the symbols is stopped, by displaying a plurality of the prognostic displays or the "reach demonstration" in sequential timing relative to each other. Although two types of the prognostic symbols are displayed in these embodiments, any number may be displayed, from at least one and up to ten types of prognostic symbols in certain embodiments of the invention.

Figure 17:
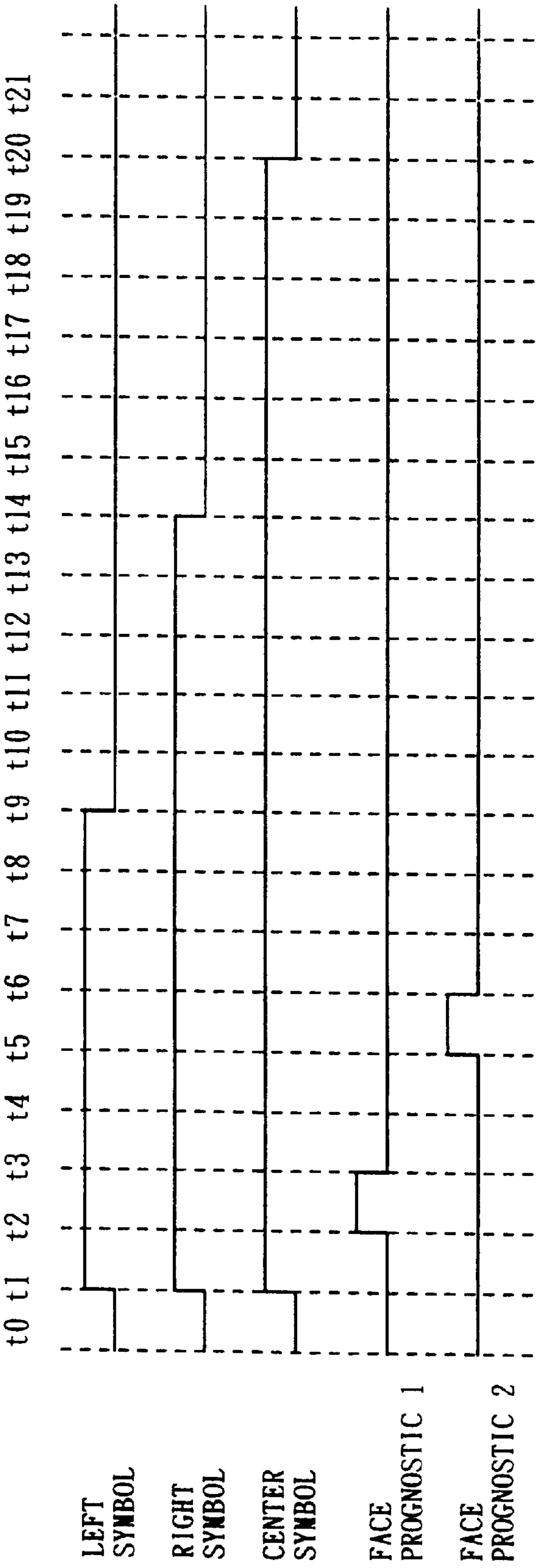
FIG. 17 is a graphical representation of a timing diagram of first example of stop timing of the variation of symbols and display timing of prognostic display.

With respect to embodiment (1) of the display timing of the prognostic display symbols, the timing diagram in FIG. 17 shows an embodiment of the invention in which the prognostic display symbols are displayed during the time beginning with the starting of the variations of all variable symbols to the time when the variation of a first one of the variable symbols is stopped, which is hereinafter referred to the "first symbol stop." Similarly, subsequent stopping of the variation of a second one of the variable symbols is referred to as the "second symbol stop;" and the stopping of the variation of the third symbol stop is referred to as the "third symbol stop." "Prognostic facial expression 1" and "prognostic facial expression 2" are sequentially displayed after the variations of the three variable symbols are started, such sequential display continuing until the variation of any one of the variable symbols (in this embodiment, left symbol 2L) is stopped.

Figure 18:
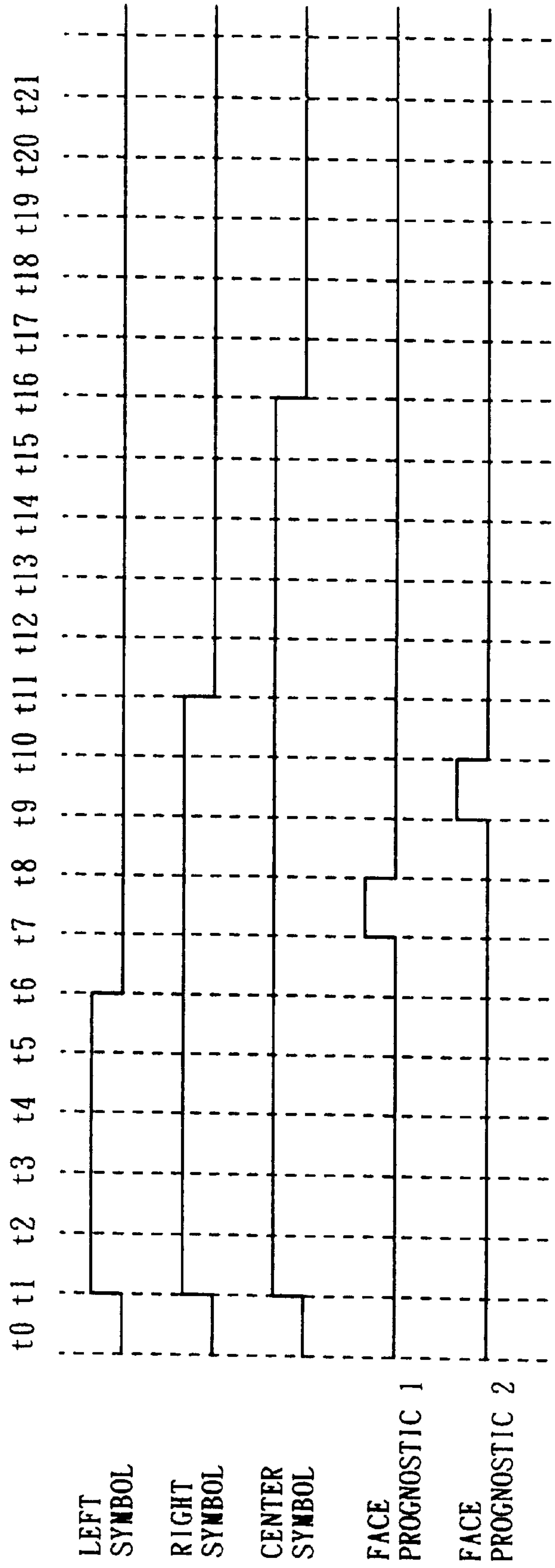
FIG. 18 is a graphical representation of a timing diagram of second example of stop timing of the variation of symbols and display timing of prognostic display.

With respect to embodiment (2) of the display timing of the prognostic display symbols, the timing diagram in FIG. 18 shows an embodiment of the invention in which the prognostic display symbols are displayed from the first symbol stop to the second symbol stop. Variations of the three variable display symbols are started, and from the time that the variation of any one of the other variable symbols (in this embodiment, left symbol 2L) is stopped until the variation of any one of the other two variable symbols (in this embodiment, right symbol 2R) is stopped, the "first prognostic facial expression" and the "second prognostic facial expression" are sequentially displayed.

Figure 19:
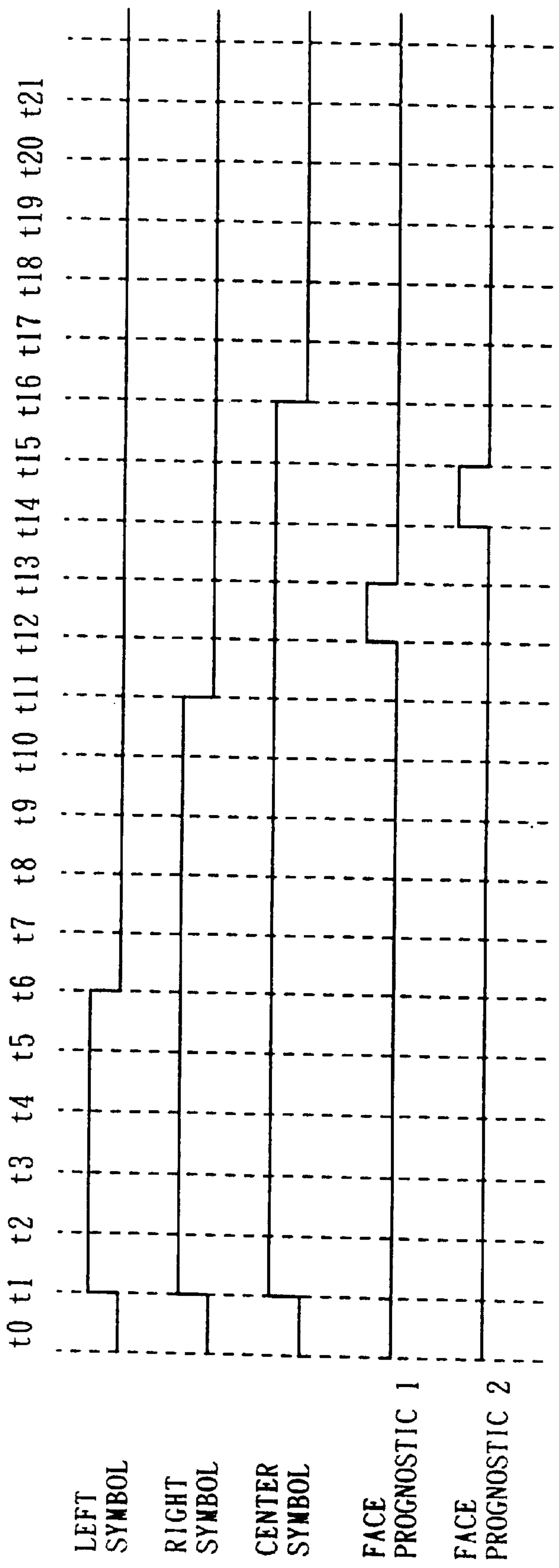
FIG. 19 is a graphical representation of a timing diagram of third example of stop timing of the variation of symbols and display timing of prognostic display.

With respect to embodiment (3) of the display timing of the prognostic display symbols, the timing diagram in FIG. 19 shows an embodiment of the invention in which the prognostic display symbols are displayed from the second symbol stop to the third symbol stop. Variations of the three variable display symbols are started. Thereafter, variation of any one of the other variable symbols (in this embodiment, left symbol 2L) is stopped. During the period beginning after variation of any one of the other two variable symbols (in this embodiment, left symbol 2R) is stopped and until the variation of the last variable symbol (in this embodiment, right symbol 2C) is stopped, the "first prognostic facial expression" and the "second prognostic facial expression" are sequentially displayed.

Figure 20:
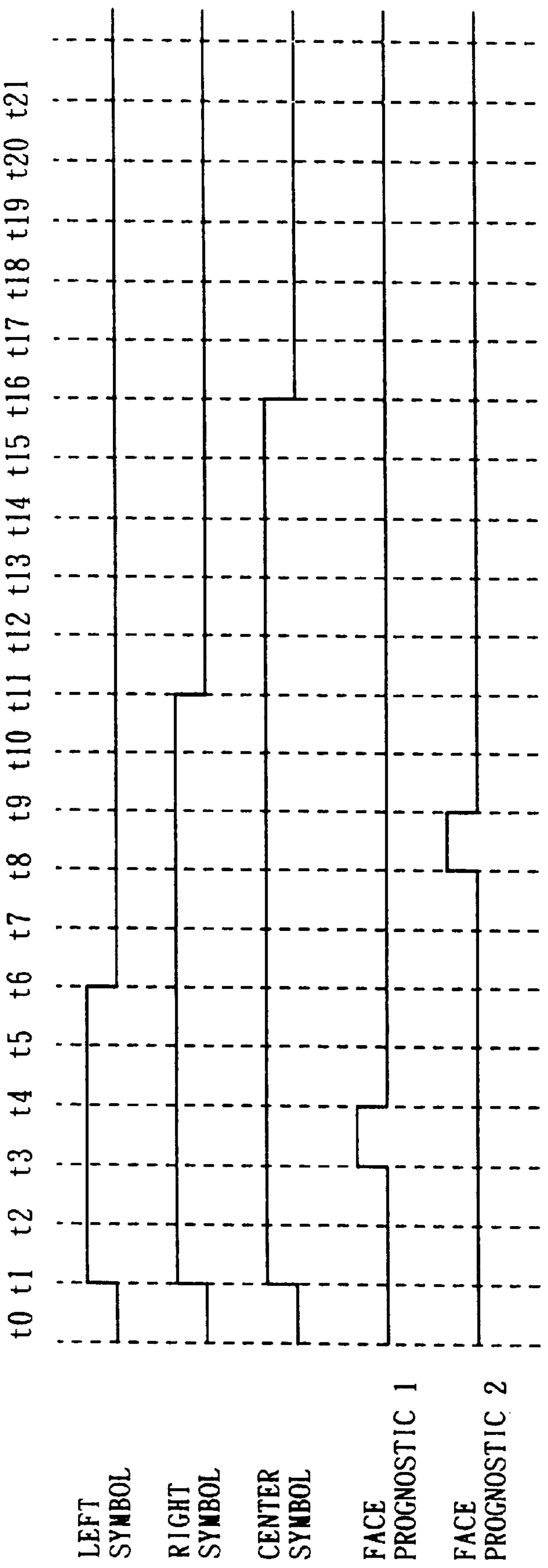
FIG. 20 is a graphical representation of a timing diagram of fourth example of stop timing of the variation of symbols and display timing of prognostic display.

With respect to embodiment (4) of the display timing of the prognostic display symbols, the timing diagram in FIG. 20 shows an embodiment of the invention in which at least one prognostic display symbol is displayed from the start of the variations of the variable symbols to the first symbol stop, and at least one prognostic display symbol is displayed from the first symbol stop to the second symbol stop. After the start of the variations of the three variable symbols, "prognostic facial expression 1" is displayed until the variation of any one of the other two variable symbols (in this embodiment, left symbol 2L) is stopped. "Prognostic facial expression 2" is displayed after variation of one variable symbol has been stopped and until the variation of any one of the other two variable symbols (in this embodiment, right symbol 2R) is stopped.

Figure 21:
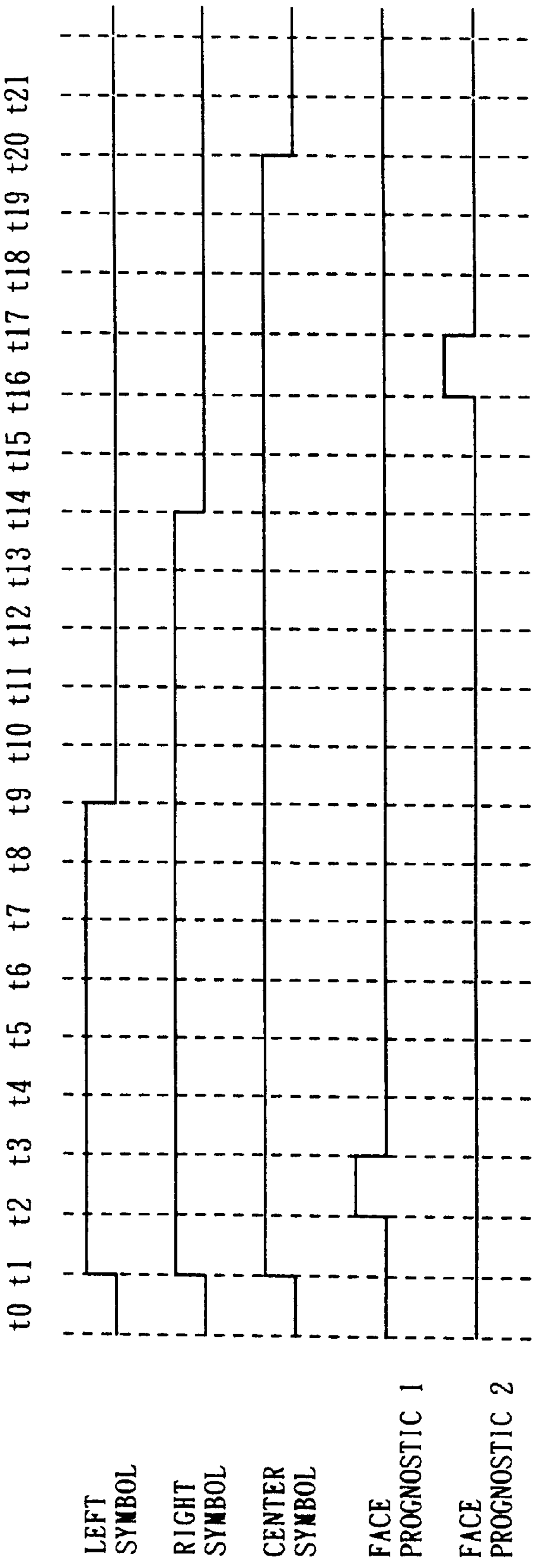
FIG. 21 is a graphical representation of a timing diagram of fifth example of stop timing of the variation of symbols and display timing of prognostic display.

With respect to embodiment (5) of the display timing of the prognostic display symbols, the timing diagram in FIG. 21 shows an embodiment of the invention in which at least one prognostic display symbol is displayed from start of the variations of the variable symbols to the first symbol stop, and at least one prognostic display symbol is displayed from the second symbol stop to the third symbol stop. After the start of the variations of the three variable symbols, "prognostic facial expression 1" is displayed until the variation of any one of the variable symbols (in this embodiment, left symbol 2L) is stopped, and after variation of one of the variable symbol has been stopped, "prognostic facial expression 2" is displayed until the variations of the other variable symbols (in this embodiment, right symbol 2R and center symbols 2C) are stopped.

Figure 22:
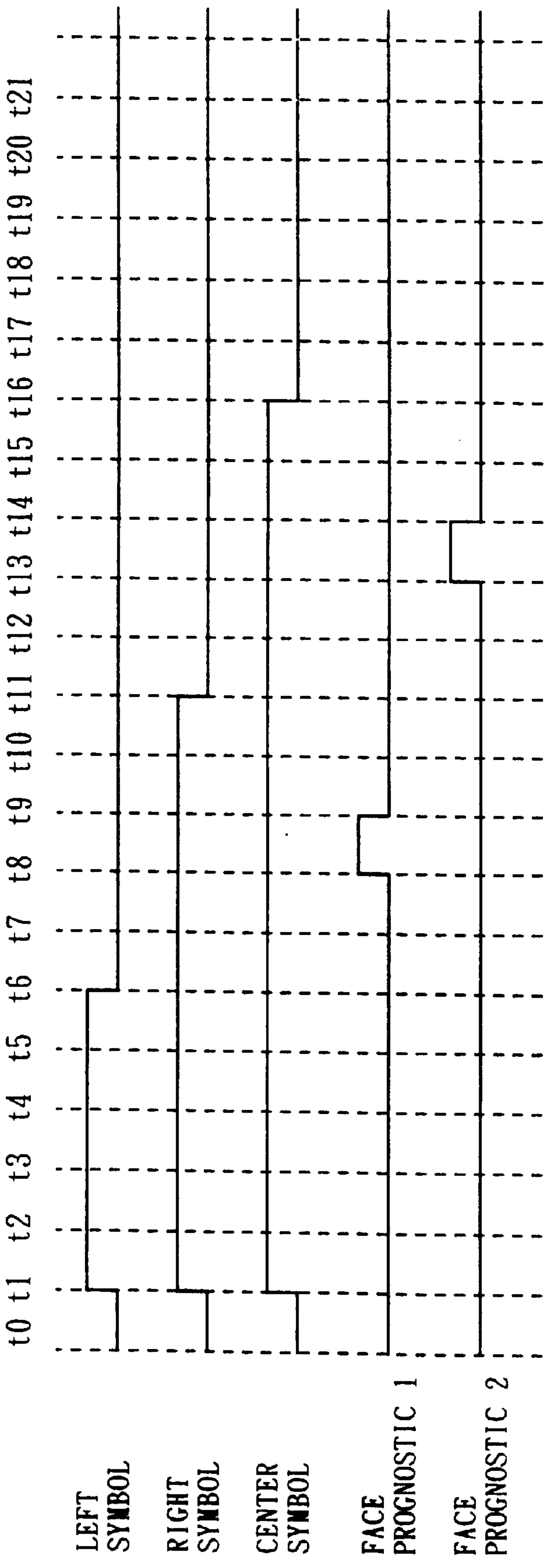
FIG. 22 is a graphical representation of a timing diagram of sixth example of stop timing of the variation of symbols and display timing for prognostic display.

With respect to embodiment (6) of the display timing of the prognostic display symbols, the timing diagram in FIG. 22 shows an embodiment of the invention in which the start of the variations of the variable symbols, at least one prognostic display symbol is displayed from the first symbol stop to the second symbol stop, and at least one prognostic display symbol is displayed from the second symbol stop to the third symbol stop. Variations of the three variable symbols are started, and thereafter the variation of any one of the variable symbols (in this embodiment, left symbol 2L) is stopped. "Prognostic facial expression 1" is then displayed before any one of the other two variable symbols (in this embodiment, right symbol 2R) is stopped. After the variations of two variable symbols have been stopped, "prognostic facial expression 2" is displayed until the variation of the last variable symbol (in this embodiment, right symbol 2R or center symbol 2C) is stopped.

Figure 23:
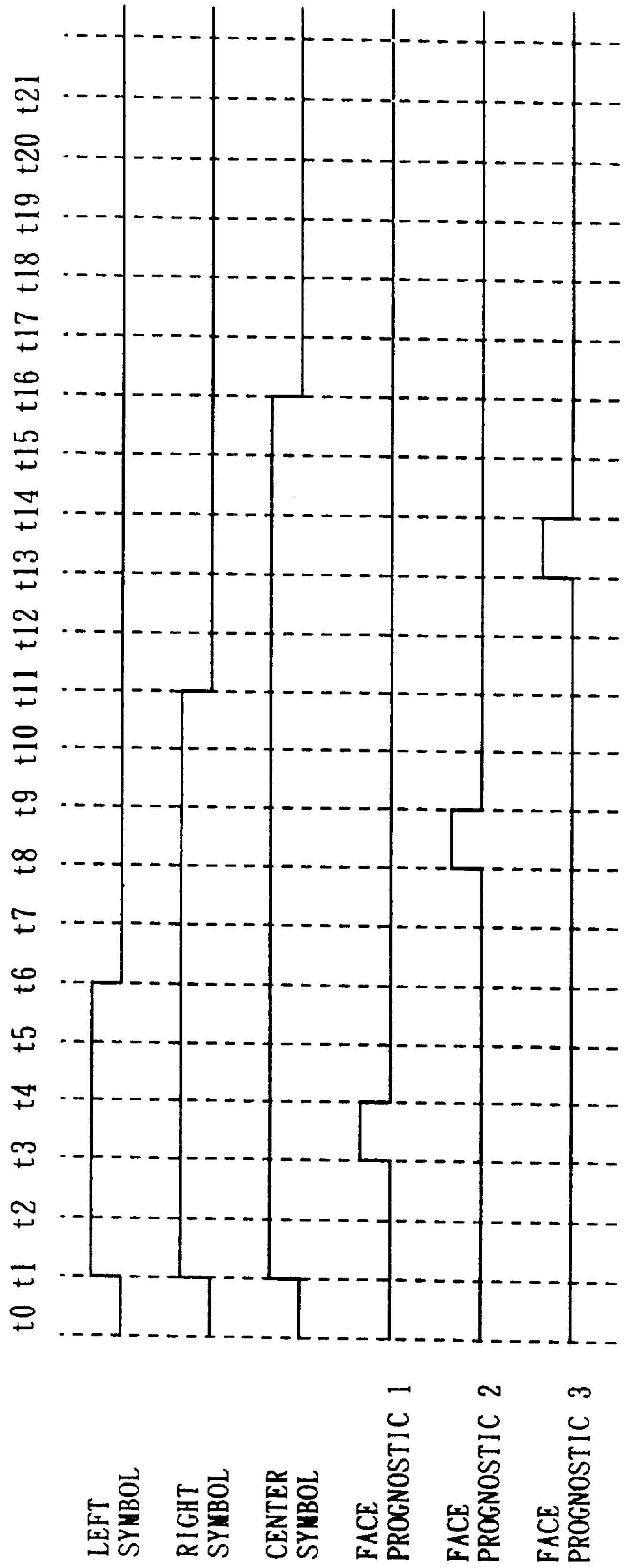
FIG. 23 is a graphical representation of a timing diagram of seventh example of stop timing of the variation of symbols and display timing for prognostic display.

With respect to embodiment (7) of the display timing of the prognostic display symbols, the timing diagram in FIG. 23 shows an embodiment of the invention for displaying the prognostic display symbol in which at least one prognostic display symbol is displayed from the start of the variations of all variable symbol display to the first symbol stop, at least one prognostic display symbol is displayed from the first symbol stop to the second symbol stop, and at least one prognostic display symbol is displayed from the second symbol stop to the third symbol stop. After the start of the variations of the three variable symbols, "prognostic facial expression 1" is displayed until the variation of any one of the variable symbols (in this embodiment, left symbol 2L) is stopped. "Prognostic facial expression 2" is displayed until the variation of any one of the other two variable symbols (in this embodiment, right symbol 2R) is stopped, and "prognostic facial expression 3" is displayed until the variation of the last of the variable symbols (in this embodiment, center symbols 2C) is stopped. In this embodiment, "prognostic facial expression 3" is used in embodiments that display three kinds of prognostic facial expression symbols instead of two kinds of prognostic facial expression symbols.

Figure 24:
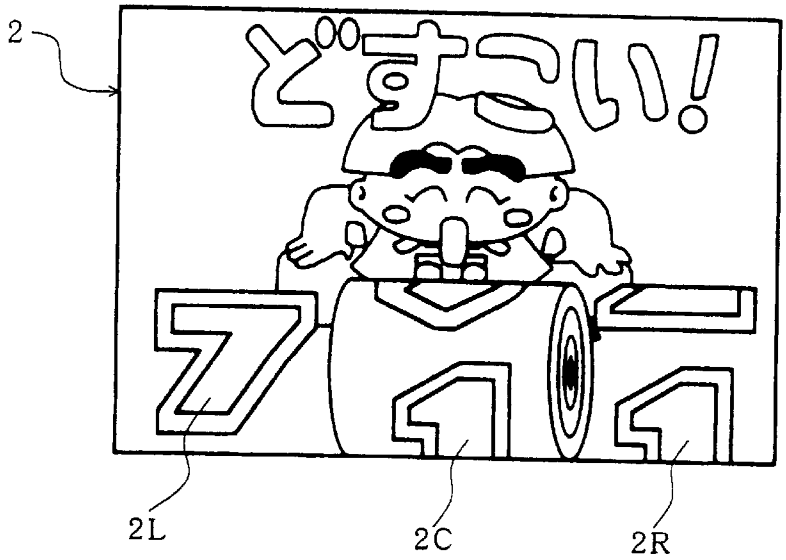
FIG. 24 is a representation that illustrates a display of "prognostic facial expression 1;"
Figure 25:
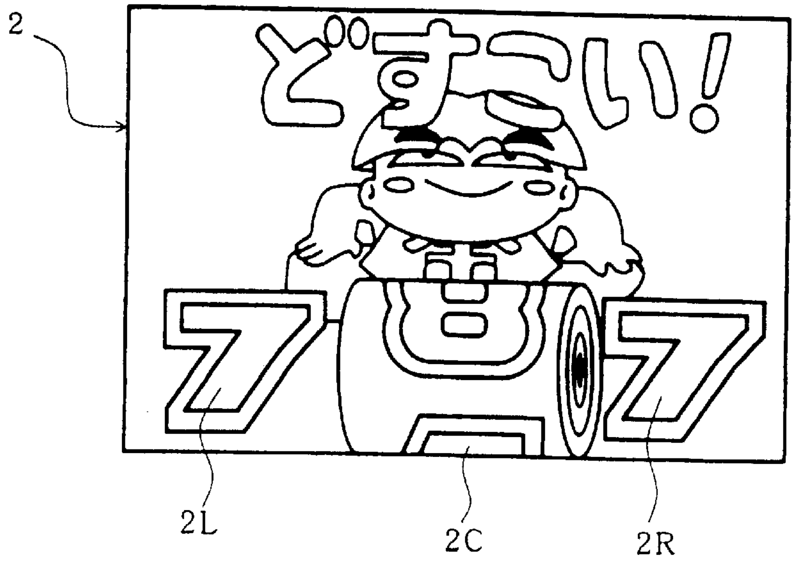
FIG. 25 is a representation that illustrates a display of "prognostic facial expression 2;"

FIGS. 24 and 25 show examples of the prognostic display symbols to be displayed. FIG. 24 shows the display example for "prognostic facial expression 1." Left symbol 2L is stopped to indicate "7," and "Kintaro" with the "laughing facial expression" (face symbol 2 in FIG. 3) is displayed. The player therefore can predict that the likelihood of the big hit must be high.

FIG. 25 shows the display example for "prognostic facial expression 2" and left symbol 2L and right symbol 2R are stopped to indicate "7," respectively, and "Kintaro" with the "effeminate facial expression" (face symbol 4 in FIG. 3) is displayed. The player who recognizes these displays will know that this face symbol is associated with the lower likelihood group than the former laughing face group, the player may predict that the "big hit" likelihood must be lower than the likelihood previously recognized. When "Kintaro" with the "laughing facial expression" is displayed repeatedly, the player can predict that the likelihood of the "big hit" is quite high. When the player recognizes this, the player tends to pay more attention to the stop display of the center symbol 2C, with a high degree of anticipation.

As shown in FIG. 25, when left symbol 2L and right symbol 2R are stopped to indicate the same symbols, the display for the "reach demonstration" determined in the previous step ST12 is started simultaneously with the display of "prognostic facial expression 2." The display for the "reach demonstration" continues until the variation of center symbol 2C is stopped to display a stop symbol (t14 to t20 shown in FIG. 15).

Figure 26:
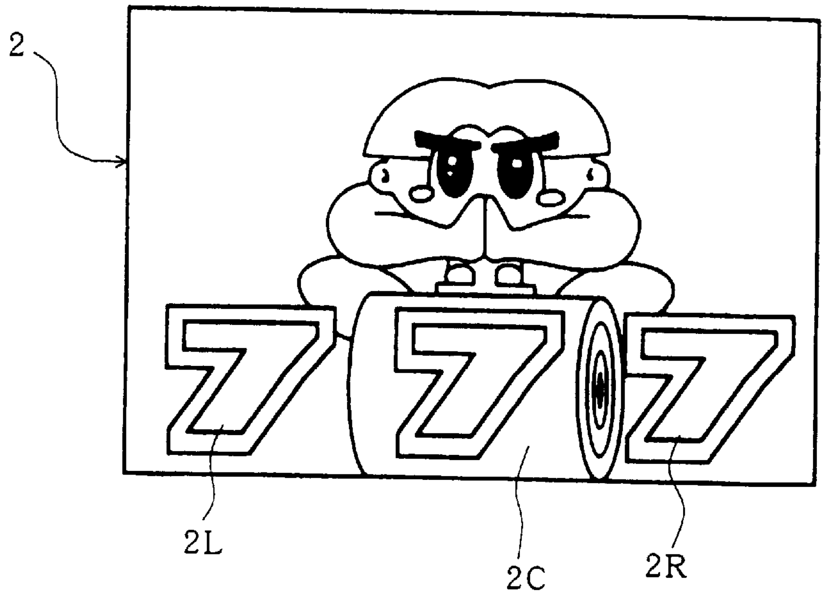
FIG. 26 is a representation that illustrates a display of "clapping reach:"
Figure 27:
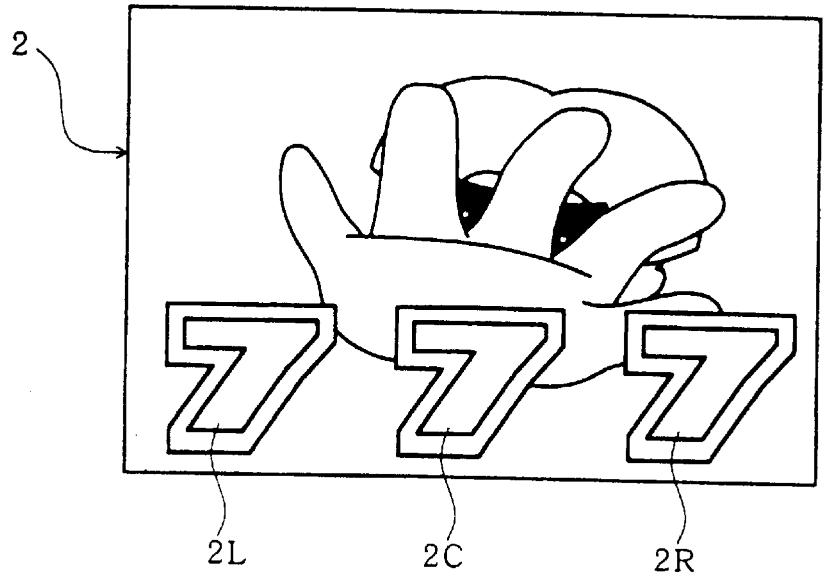
FIG. 27 is a representation that illustrates a display of "Harite reach;"

By way of example, the "clapping reach" shown in FIG. 26 is a "reach demonstration" that shows "Kintaro" to be clapping. The "Harite reach" shown in FIG. 27 is a "reach demonstration" that shows "Kintaro" to be slapping by directing his hand toward the front face of the screen, i.e., an action of slapping a person in the face. However, when the "all rotation reach" is selected, as shown in the timing diagram of FIG. 15, after a predetermined time has passed (t5), the three variable symbols (left symbol 2L, center symbols 2C, and right symbol 2R) are arranged to display the same symbols. Subsequently, all of the symbols are simultaneously started into variation gradually and thereafter the variations of the three variable symbols are stopped simultaneously to display their respective stop symbols at t20. In this embodiment, there is no execution of stop action. Left symbol 2L is stopped at t9, and right symbol 2R is stopped at t14.

Figure 28:
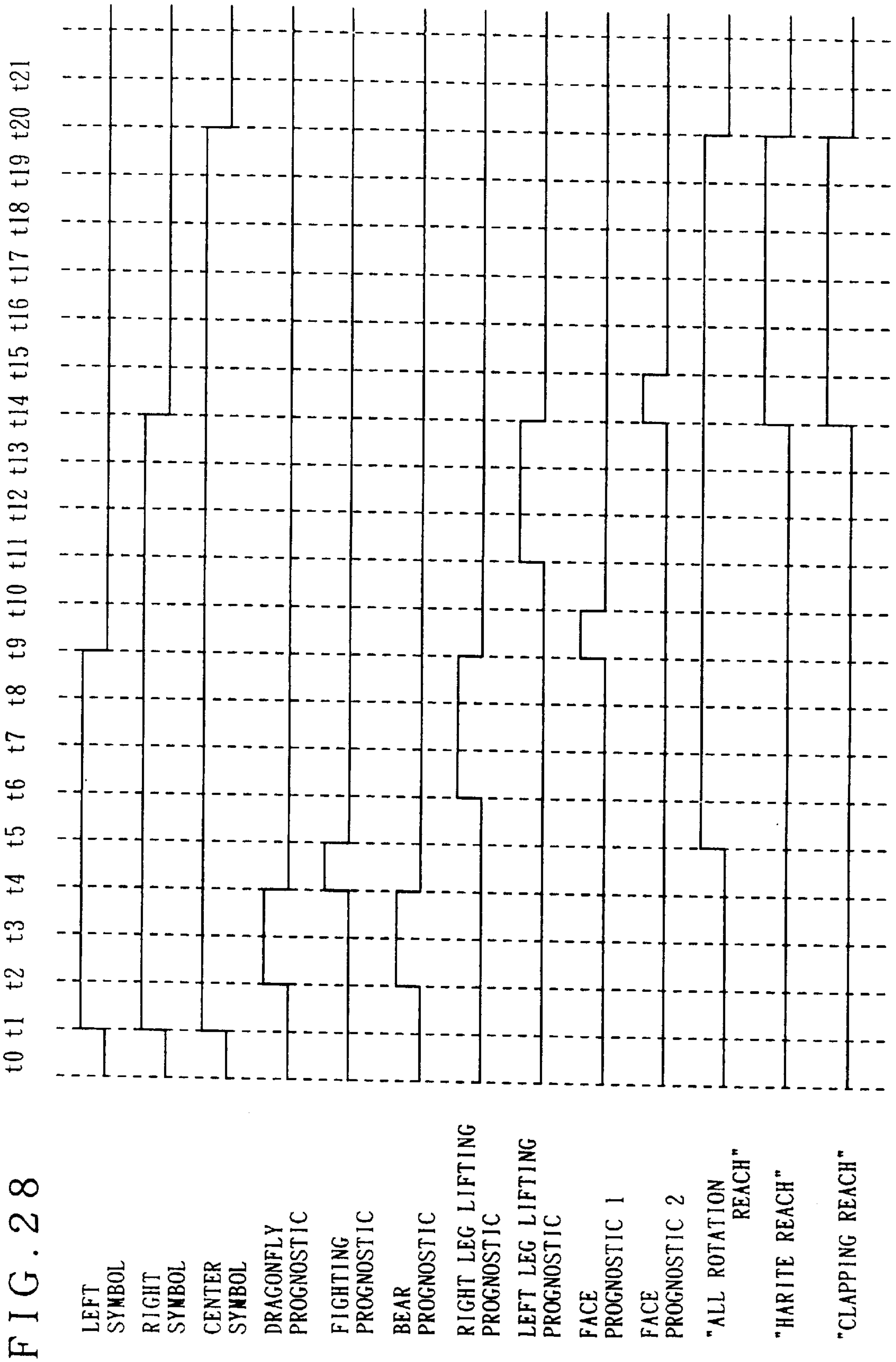
FIG. 28 is a graphical representation of a timing diagram of third example of display duration for variation of symbols, prognostic displays, and "reach" demonstrations.

FIG. 28 is a graphical representation of a timing diagram for the display timing of the prognostic display, wherein prognostic displays such as the "dragonfly prognostic," the "fighting prognostic," the "bear prognostic," the "left leg lifting prognostic," and the "right leg lifting prognostic," are further added. A determination method for these prognostic displays will be explained hereinafter.

Each of the "dragonfly prognostic," the "fighting prognostic," and the "bear prognostic," is a display for predicting the appearance of the "big hit" with a predetermined likelihood, and is displayed when the likelihood of the "big hit" is quite high. The display timing is arranged to be displayed for a certain period in a time from the start of the variation action of the symbol variation display portion 2*a* to the stop of any one of the variable symbols (t1 to t9).

Figure 29:
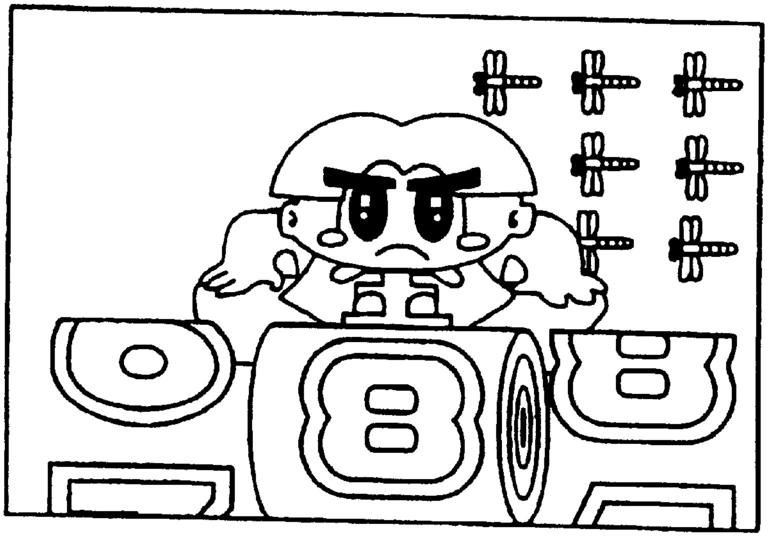
FIG. 29 is a representation that illustrates a display of "dragonfly prognostic;"

FIG. 29 is a representation of the "dragonfly prognostic" in which a plurality of dragonflies are displayed crossing behind the "Kintaro."

Figure 30:
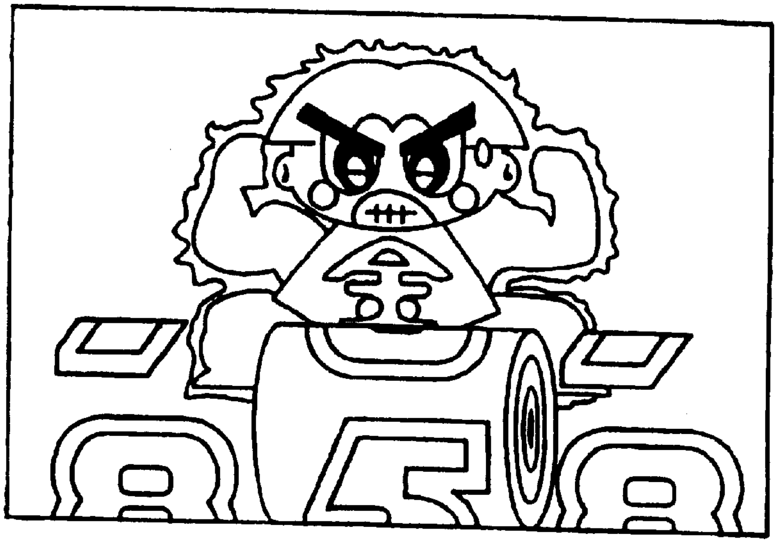
FIG. 30 is a representation that illustrates a display of "fighting prognostic;"

FIG. 30 is a representation of the "fighting prognostic" in which "Kintaro" is displayed in his fighting pose.

Figure 31:
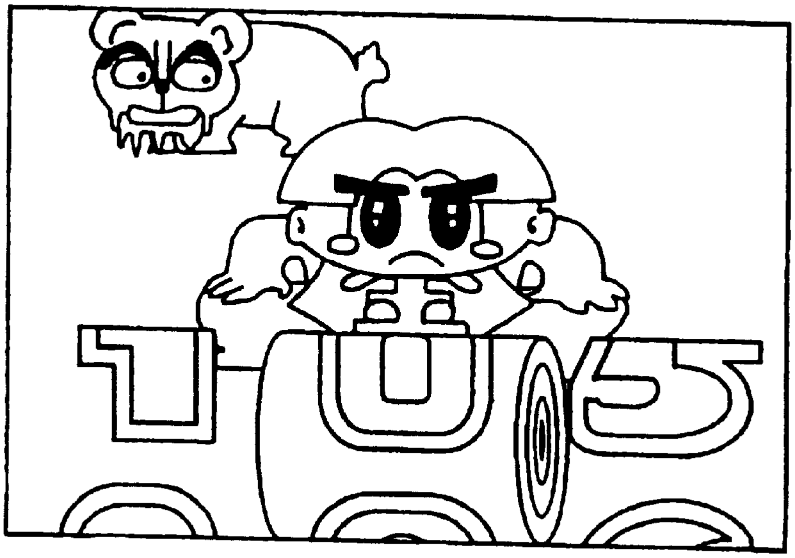
FIG. 31 is a representation that illustrates a display of "bear prognostic;"

FIG. 31 is a representation of the "bear prognostic," in which a bear is displayed crossing behind the "Kintaro."

Figure 32:
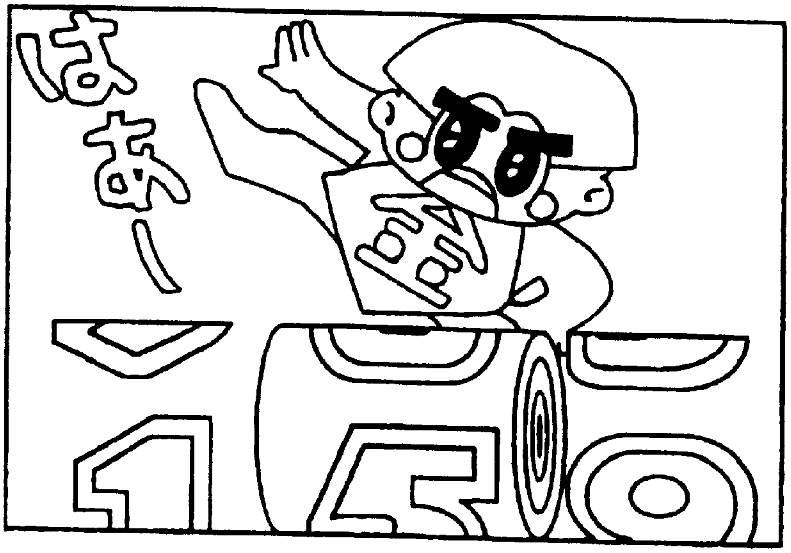
FIG. 32 is a representation that illustrates a display of "right leg lifting prognostic;"
Figure 33:
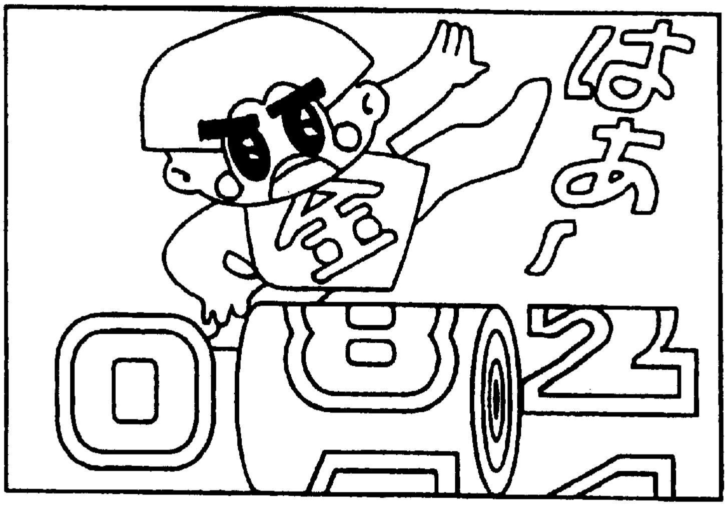
FIG. 33 is a representation that illustrates a display of "left leg lifting prognostic;"

FIGS. 32 and 33 are representations of the "right leg lifting prognostic," and the "left leg lifting prognostic," respectively, which are displayed after the "dragonfly prognostic." When the "right leg lifting prognostic," and the "left leg lifting prognostic," may be combined to "prognostic facial expression 1" and "prognostic facial expression 2" a story line may be provided to the prognostic display. For example, the "right leg lifting prognostic," includes the movements of "Kintaro" with the lifting his right leg accompanied with a shout of "Haah" like an initial charge of a Sumo athlete (the timing for this display corresponds to t6 in the timing diagram in FIG. 28), and then returning his leg and hands to the initial posture of the Sumo athlete with a Deistic shout as shown in FIG. 24 (the timing for this display corresponds to t9 in the timing diagram in FIG. 28). At this time, the stopping of left symbol 2L and the display of "prognostic facial expression 1" are executed.

After the stopping of left symbol 2L, the "left leg lifting prognostic" is executed and includes the movements of "Kintaro" lifting his left leg accompanied with a shout of "Haah" similar to that which accompanies an initial charge of a Sumo athlete (the timing for this display corresponds to t11 in the timing diagram in FIG. 28), and then returning his leg and hands to the initial posture of a Sumo athlete with a shout of "Deistic" as shown in FIG. 24 (the timing for this display corresponds to t14 in the timing diagram in FIG. 28). At this time, the stopping of right symbol 2R and the display of "prognostic facial expression 2" are executed.

Figure 34:
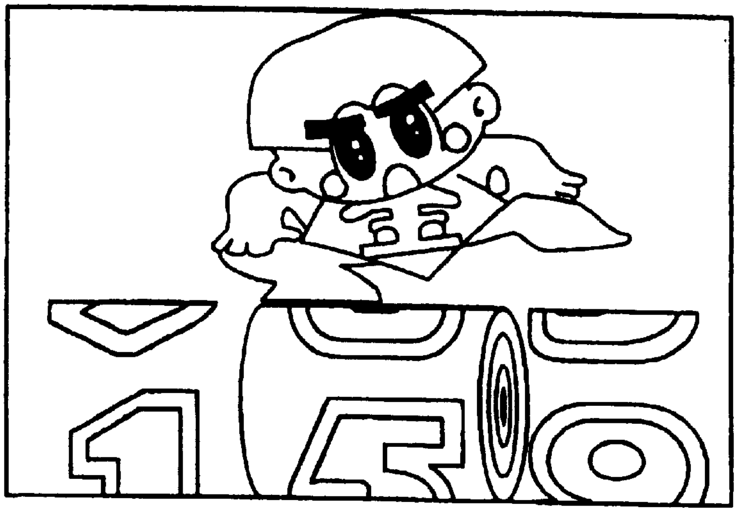
FIG. 34 is a representation that illustrates a display of "small degree left leg lifting prognostic;"

It may be possible to change the likelihood of the appearance of the "big hit" depending on the degree of the lifting of the leg of "Kintaro." For example, in FIG. 34, "Kintaro" has the posture in which his left leg is lifted to a small extent, and his posture is more similar to the initial posture of a Sumo athlete. Such a prediction is displayed to indicate that the likelihood of the "big hit" is low.

The degree of lifting the leg of "Kintaro" can be combined with the change of the facial expression, and thereby the likelihood of the "big hit" can be indicated as changed. As described above, when the likelihood is indicated by each scene within the ongoing story, the player would pay attention to the prognostic display in conjunction with the ongoing story and the "reach demonstration," as well as the stop display of the variably displayed symbol, whereby the variety of the game is extended and the player's interest in the game is increased.

Figure 5:
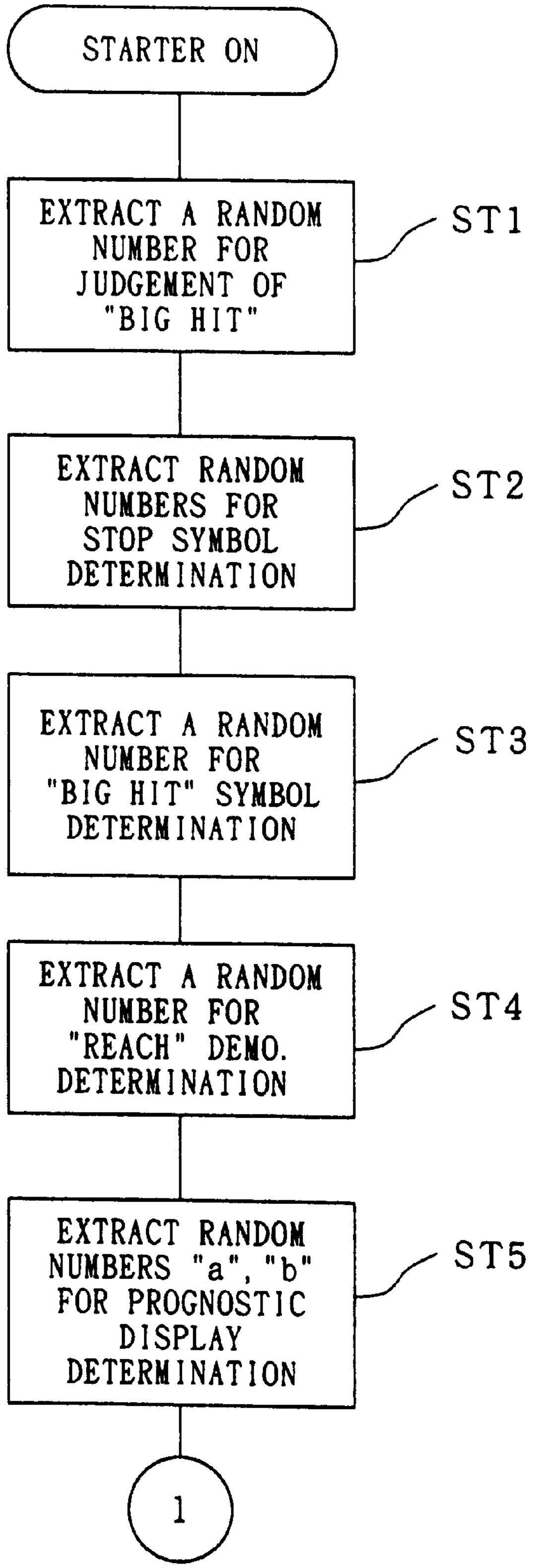
FIG. 5 is a flowchart showing a procedure for determining a prognostic to be displayed by the liquid crystal display.

Prognostics such as the "dragonfly prognostic," the "fighting prognostic," the "bear prognostic," the "left leg lifting prognostic," and the "right leg lifting prognostic," other than the prognostic facial expression are, in this embodiment, are determined by using a random number "c" for the prognostic display determination that is extracted independently from random numbers "a" and "b" extracted in step ST5 in FIG. 5. By referring the combination of the result ("big hit" or "loss") of the determination of the "big hit" and the kind of "reach demonstration" that has been determined from the prognostic display determination table shown in FIG. 35, there is selected a prognostic display that is associated with the random number value range from which the random number "c" extracted for the prognostic display determination belongs to. Therefore, demonstrations of more complex prognostic displays can be developed, such as a sequential story of prognostic displays beyond only prognostic facial expressions, and can be determined using the random number extraction methodology described herein.

In addition, the random numbers for the determination of the prognostic display are not limited in the practice of the invention to only two or three, as four or more random numbers may be extracted, thereby executing various prognostic displays with the passage of time. This would increase the extent to which the likelihood of the "big hit" can be changed.

The procedure for the symbol variation display on liquid crystal display 2 will be described below with reference to the flowcharts of FIGS. 36 and 37 .

Figure 36:
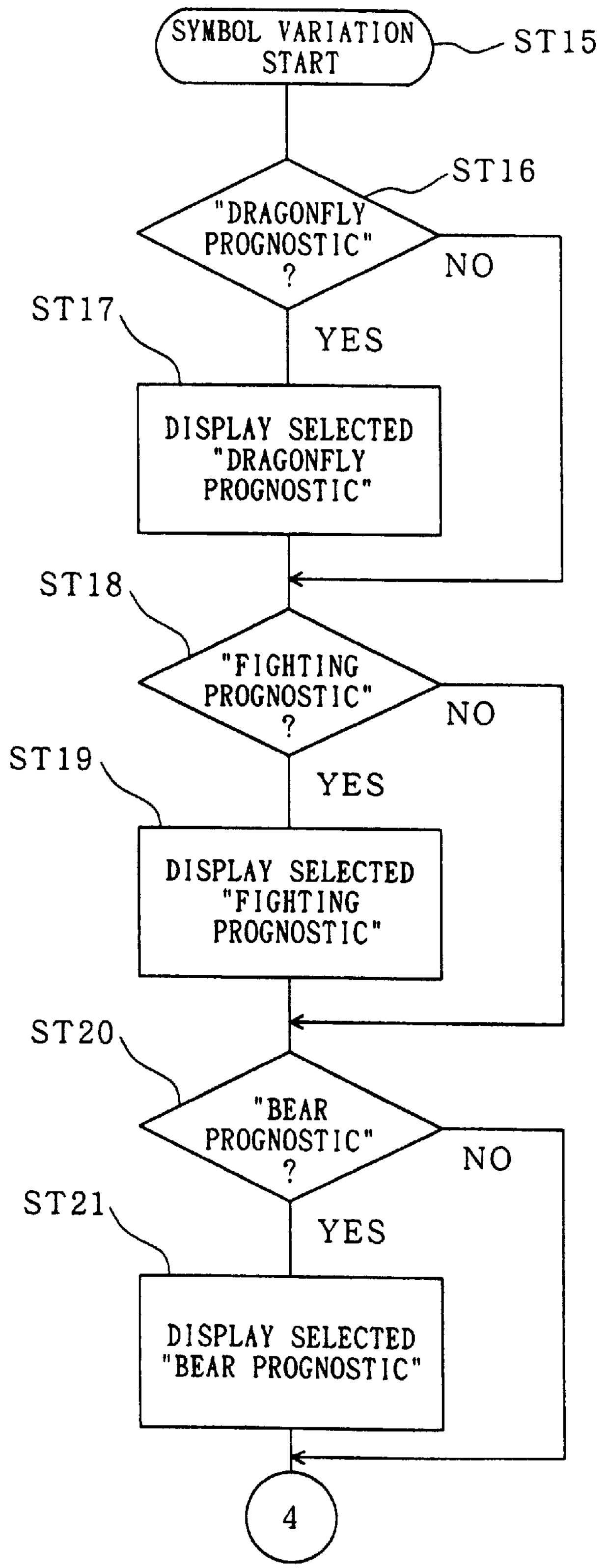
FIG. 36 is a flowchart showing an operation procedure of symbol variation display in the liquid crystal display.

In FIG. 36, variation display of the variable symbols is started (ST15), then a determination is made whether or not the "dragonfly prognostic" is to be selected (ST16). When the determination is "YES," the "dragonfly prognostic" is displayed (ST17).

Next, a determination is made as to whether or not the "fighting prognostic" is to be selected (ST18). When the determination is "YES," the "fighting prognostic" (ST19) is displayed.

Next, a determination is made whether or not the "bear prognostic," is to be selected (ST20).

When the determination is YES, the "bear prognostic," (ST21) is displayed.

Figure 37:
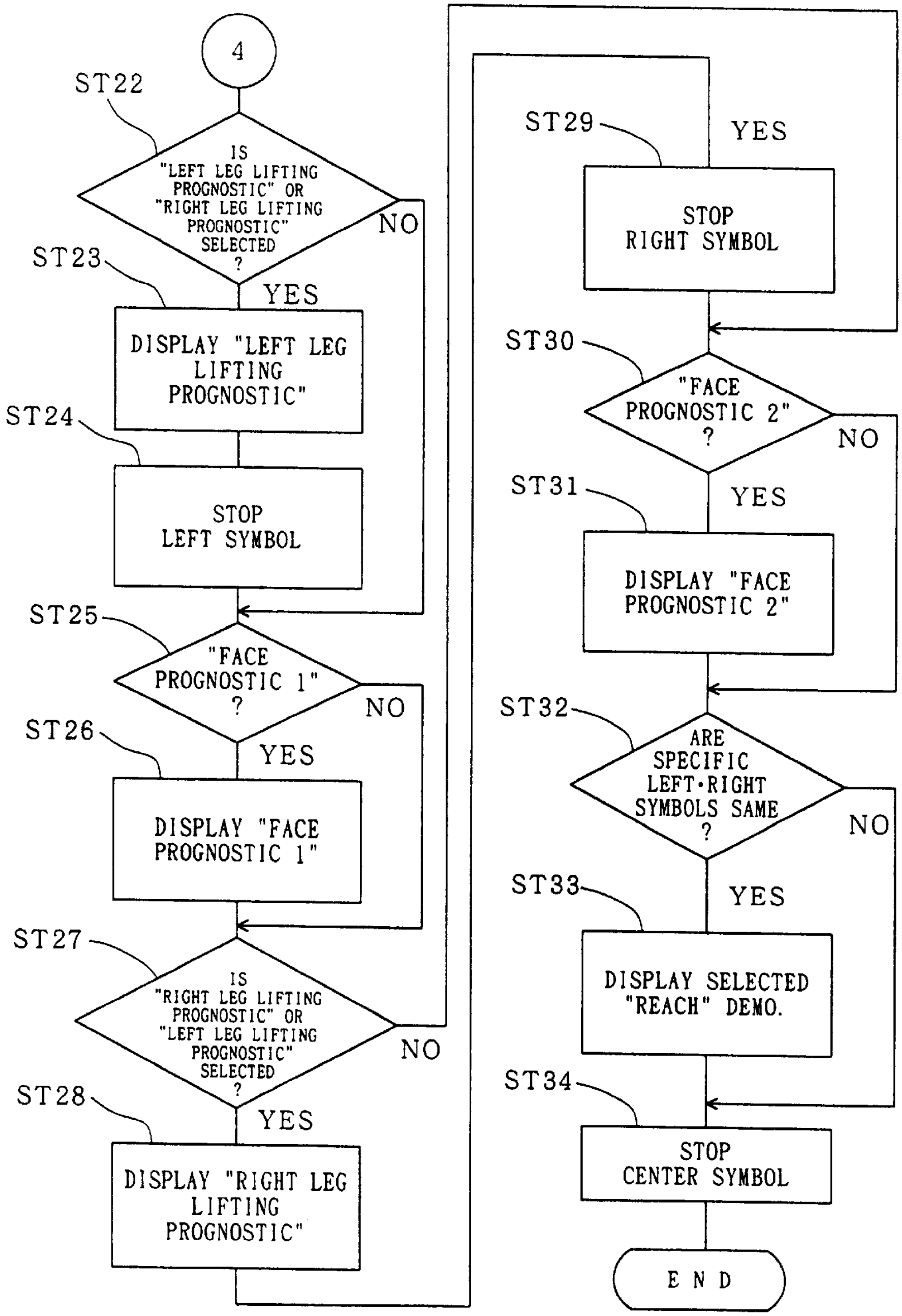
FIG. 37 is a continuation of the flowchart of FIG. 36.

Subsequently, as shown in FIG. 37, the determination whether or not the "right leg lifting prognostic," or the "left leg lifting prognostic," is to be selected is executed (ST22). When the determination is "NO," the procedure of step ST25 is performed. When the determination is "YES," the "right leg lifting prognostic," (ST23) is displayed and left symbol 2L is stopped (ST24).

A determination is made whether or not "prognostic facial expression 1" is displayed (ST25). When the determination is "YES," the "prognostic facial expression 1" is displayed (ST26).

Subsequently, a determination is made whether or not the "right leg lifting prognostic," or "left leg lifting prognostic," the is to be selected again (ST27). When the determination is "NO" the procedure of step ST30 is proceeded. When the determination is "YES" the "right leg lifting prognostic," is displayed (ST28) and right symbol 2R is stopped (ST29).

The determination whether or not the "prognostic facial expression 2" is to be displayed is executed (ST30). When the determination is "YES" the "prognostic facial expression 2" is displayed (ST31).

A determination is made whether or not the left and right stop symbols are to be the same (ST32). When the determination is "YES," the selected "reach demonstration" is displayed (ST33), then center symbol 2C is stopped (ST34), thereby finishing the display procedure on liquid crystal display 2.

When the combination of the stopped symbols corresponds to the "big hit" the above-mentioned big-winning hole 4 is opened to create a game condition where the player can easily obtain a determined number of prize balls, and hence, the player's expectation for appearance of a "big hit" is quite high. Therefore, the player's interest in the game will be significantly enhanced by providing a prognostic display that changes the likelihood of the "big hit" prior to the game reaching the "big hit" condition.

The symbols associated with high likelihood of the "big hit" can, in some embodiments, be included in the prognostic display determination table that is selected when the determination of the "big hit" corresponds to a "loss." Therefore, even if the reach face symbol displayed in the above-mentioned "prognostic facial expression 1" and "prognostic facial expression 2" belongs to the A group shown in FIG. 3, the combination of the symbols displayed in the stopped state may correspond to a "loss."

The present invention may include embodiments wherein the prognostic display symbol is not changed with the passage of time, and therefore, the likelihood of the "big hit" is not changed. Also, when the prognostic display symbol is not changed, the symbol display image may or may not be renewed.

In the foregoing example, since the display mode for the prognostic display is ordered such that "prognostic facial expression 1" is followed by "prognostic facial expression 2," and each prognostic display has a predetermined likelihood of the "big hit," the likelihood of the "big hit" may be changed by displaying the prognostic facial expression in the order of "prognostic facial expression 1" followed by "prognostic facial expression 2." In addition, the likelihood of the "big hit" is associated with each of the prognostic facial expressions, and therefore, the likelihood of the "big hit" is determined for the combination of the prognostic facial expressions such as the combination in the order of "prognostic facial expression 1" followed by "prognostic facial expression 2." That is, the prognostic display mode is determined in relation to the likelihood of the "big hit," and the prognostic display mode is changeable with the change in the game resulting from the passage of time.

The present invention may include cases in which the "reach demonstration" as described in the above embodiment is not executed.

In an embodiment described below, the controller is arranged to display a predictive display mode previously determined in correspondence to the likelihood for predicting appearance of the specific symbol display state. The predictive display mode is arranged to be changeable with a change in the game resulting from the passage of time.

Further, the embodiment is arranged so that the player can expect an appearance of the "big hit" with a degree of certainty, by arranging the prognostic display to predict the appearance of the "big hit" with 100% certainty, or to display the likelihood of the "big hit" with 0% which would be indicated by the stop symbols corresponding to the "loss."

The present invention may include embodiments in which the likelihood of the "big hit" corresponding to 100% or 0% is not provided.

FIGS. 38 and 39 show appearance probability tables in which a predetermined likelihood is formed by combining a face symbol of "prognostic facial expression 1" with a face symbol of "prognostic facial expression 2" and an appearance probability is associated with each combination of the prognostic facial expression. The letters A, B, C, and D in the tables correspond to A group, B group, C group, and D group, respectively, in face symbol determination table shown in FIG. 52, which will be explained later.

The appearance probability table of FIG. 38 shows cases where the determination of the "big hit" results in a "big hit." As known from the table, the appearance probabilities for combinations of the two prognostic facial expressions containing the A group and the B group are high. That is, the face symbols included in the A group and B group are selected from "laughing facial expression" and "effeminate facial expression," from which it is easy for the player to recognize that the likelihood of the "big hit" is high. On the other hand, the appearance probabilities for combinations of the two prognostic facial expressions containing the C group and the D group are low and in some cases the appearance probability is 0%.

The appearance probability table of FIG. 39 shows instances where the determination of the "big hit" results in "loss." As can be seen from the table, the appearance probabilities for the combinations of the two prognostic facial expressions containing the C group and the D group are high. That is, the face symbols included in the C and D groups are selected from ordinary facial expression and crying facial expression, and it is easy for the player to recognize to be a "loss." Also, the appearance probabilities for the combination of the two prognostic facial expressions including the A group and the B group are low and in some cases the appearance probability is 0%. FIG. 40 shows a table in which the probabilities of development into the "big hit." In other words, ratios of development into the "big hit" are arranged in correspondence to each combination of the prognostic facial expressions.

By way of example, when the combination of the prognostic facial expressions corresponds to "A-A" the probability of development into the "big hit" is 37.11% and the possibility of the appearance of the "big hit" is quite high compared with the other combinations. On the other hand, the probability of development into the "big hit" for the combinations of "C-C," "C-D," "D-B," "D-C," and "D-D" are extremely close to 0% such as 0.07%, 0.06%, 0.02%, 0.1%, and 0.03%, respectively, the possibility of the appearance of the "big hit" is extremely low. However, even if a face symbol of the A group has appeared as the first "prognostic facial expression 1" the probability of development into the "big hit" becomes 0.17% when a face symbol of the D group appears subsequently as "prognostic facial expression 2." As a result, the "big hit" hardly appear. That is, if a face symbol of the A group appears first as "prognostic facial expression 1" the player expects a higher likelihood of development into the "big hit" at this time compared to the appearance of a face symbol of the B, C or D group, so that the likelihood of the "big hit" may be thought high at this time. At the time when the prognostic facial expressions of the D group appear as "prognostic facial expression 2" the likelihood of development into the "big hit" is changed to a lower value compared with the value at the time of "prognostic facial expression 1" so that the likelihood of the "big hit" becomes lower compared with at the time of "prognostic facial expression 1."

Even if a face symbol having a low likelihood appears first as "prognostic facial expression 1," the likelihood of development into the "big hit" may be greatly changed depending on a face symbol that will subsequently appear as "prognostic facial expression 2." For example, even if the face symbol of the A group appears first as "prognostic facial expression 1" the probability of development into the "big hit" is reduced to as low as 3.17% when a face symbol of the B group appears subsequently as "prognostic facial expression 2." However, if a face symbol of the B group appears as the first "prognostic facial expression 1" and a face symbol of the B group appears subsequently as "prognostic facial expression 2" the probability of development into the "big hit" is increased to 18.07%. Thus, even if the face symbols with the low likelihood of development into the "big hit" appear first, the probability of development into the "big hit" is sometimes increased depending on the prognostic facial expressions that will subsequently appear. As a result, the player may sustain his expectation for the "big hit" until the last prognostic display symbol appears.

The determination whether the display will be developed into the "reach demonstration" with the predetermined probabilities depends on the combination of the prognostic facial expressions. FIG. 41 is a table in which the probabilities of development into "reach demonstration" are arranged correlated to each combination of the prognostic facial expressions.

For example, 100% probability of development into "reach" is associated to each three combinations of "A-A," "A-B," and "B-B." When two of the face symbols belonging to the A group and the B group sequentially appear, the possibility of subsequent development into "reach demonstration" is very high. However, even in the combination of the A group and the B group, the probability is decreased to 25% in the combination of "B-A." Even if a face symbol of the A group has appeared as the first "prognostic facial expression 1," the likelihood of development into "reach" may greatly be changed depending on the face symbol that will subsequently appear as "prognostic facial expression 2." For example, if a face symbol of the A group appears as "prognostic facial expression 2" the probability of development into each is 100%, as mentioned above. However, if a face symbol of the D group appears as "prognostic facial expression 2" the probability of development into "reach" becomes 2%. Similar to the likelihood of development into the "big hit" described above, if a face symbol having a low likelihood of development into "reach" has appeared, the likelihood of development into "reach" is sometimes increased depending on the face symbol that subsequently appears.

Figure 42:
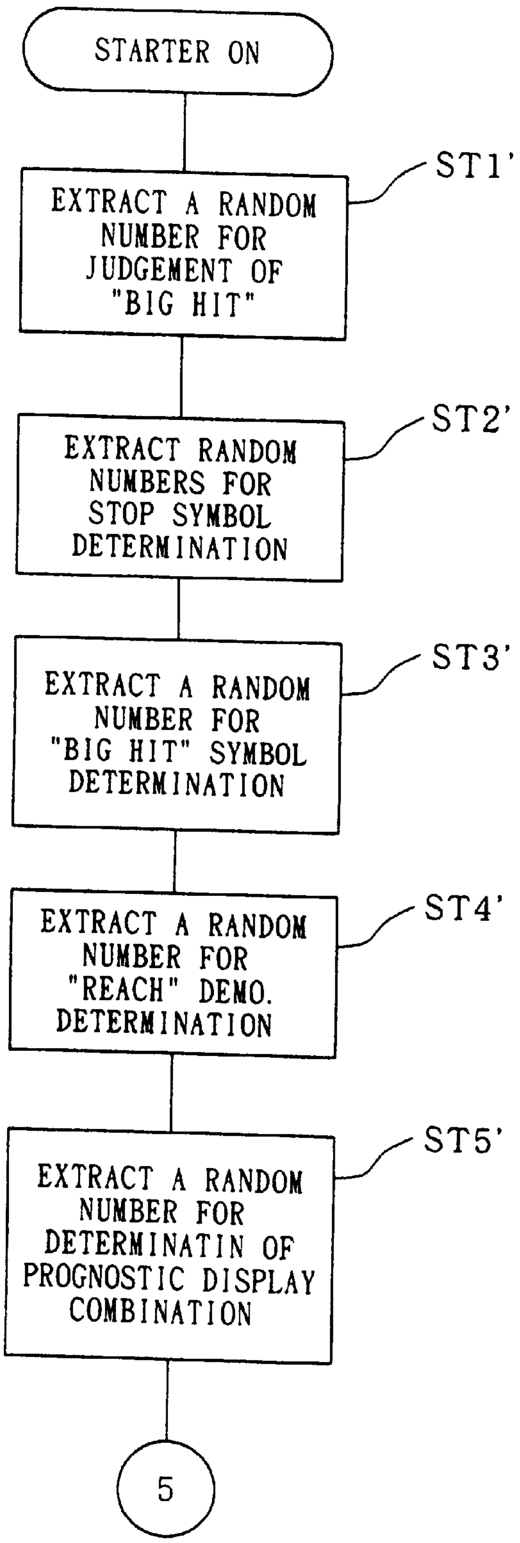
FIG. 42 is a flowchart of a further example for a determination operation procedure for display on the liquid crystal display device of the pachinko game machine of the present invention.
Figure 43:
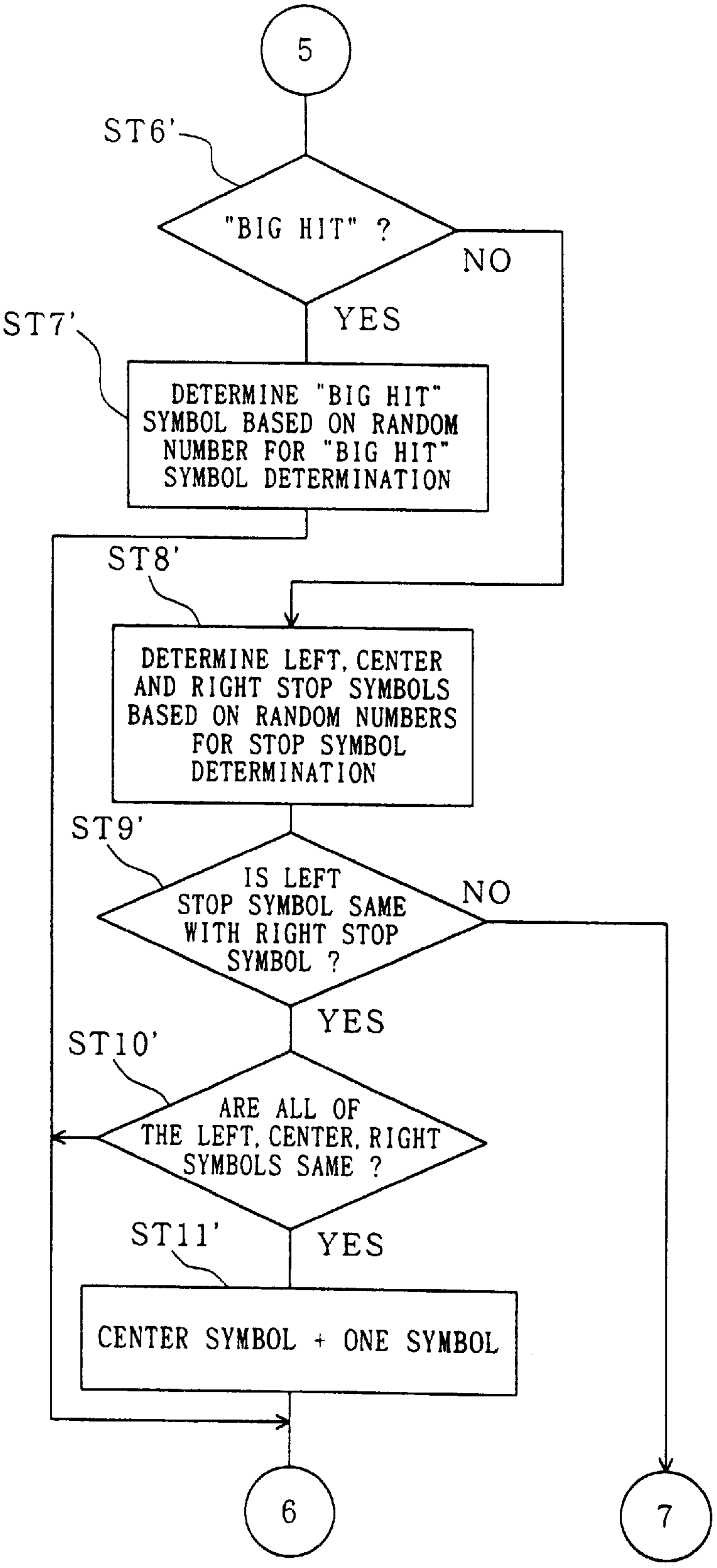
FIG. 43 is a continuation of the flowchart of FIG. 42.

A procedure for the determination of prognostic facial expressions will be described below with reference to the flowcharts in FIGS. 42 to 44 and to a table presented in FIG. 45 that shows ranges of random number values to be extracted.

The above-mentioned random number generation circuit 53 generates random numbers. In FIG. 42, CPA 50A extracts a random number for the determination of the "big hit" in the range from 0 to 255 shown in FIG. 45 (ST1'), and then extracts random numbers for the determination of the stop symbol in the range from 0 to 14 that are used as the determination random numbers for the three variable symbols (left variable symbol 2L, center variable symbol 2C, and right variable symbol 2R each displayed on symbol variation display portion 2*a* shown in FIG. 2) to be stopped (ST2'). CPA 50A extracts a random number for determination of the big hit in the range from 0 to 14 (ST3') and then extracts a random number for determination of the reach demonstration in the range from 0 to 139 (ST4'). CPA 50A further extracts a random number for the determination of a combination of prognostic displays in a range from 0 to 39 (ST5').

Subsequently, a determination is made whether or not a symbol variation display to be displayed corresponds to the "big hit," based on the random number for the determination of the "big hit" extracted in ST1' shown in FIG. 43 (ST6').

The determination results in the "big hit" referring to the "big hit" determination table shown in FIG. 9 when "7" is extracted as the random number for the "big hit."

When the determination results in the "big hit" in step ST6', since the stop symbols corresponding to the "big hit" are to be displayed when the variation action on symbol variation display portion 2*a* is stopped, a procedure for determining "big hit" symbols to be displayed is subsequently executed. In this procedure, "big hit" symbols to be displayed are determined from the "big hit" symbol determining table shown in FIG. 10 correlated to the random number for the determination of the big hit symbol extracted in step ST3' (ST7'). Thus, the "big hit" is determined and the big hit symbols to be displayed are also determined. Thereafter, the procedure of step ST12' shown in FIG. 44 is executed.

In step ST6' when the value extracted for the random number for determination of the big hit is a value other than "7" and is determined to be "loss" based on the "big hit" determination table shown in FIG. 9, the stop symbols displayed on left symbol 2L, center symbol 2C, and right symbol 2R are determined from the "stop symbol determination table" shown in FIG. 11 correlated to the three random numbers for the "determination of the stop symbol" extracted in the above-mentioned step ST2' (ST8').

Among the stop symbols determined, whether the stop symbols of the left symbol 2L and the right symbol 2R are to be the same is determined (ST9'). When the two symbols are different, the procedure of step ST13 shown in FIG. 44 is executed, since any "reach demonstration" is no longer necessary. When the above two symbols are the same, it is determined whether the center symbol 2C will be the same as the other two symbols (ST10'). If center symbol 2C is different from the other two symbols, the procedure of step ST12 shown in FIG. 7 is executed. If all three symbols are determined to be the same, which rarely happens, the symbol that is determined for center symbol 2C is changed to the next symbol in sequence (ST11').

Figure 44:
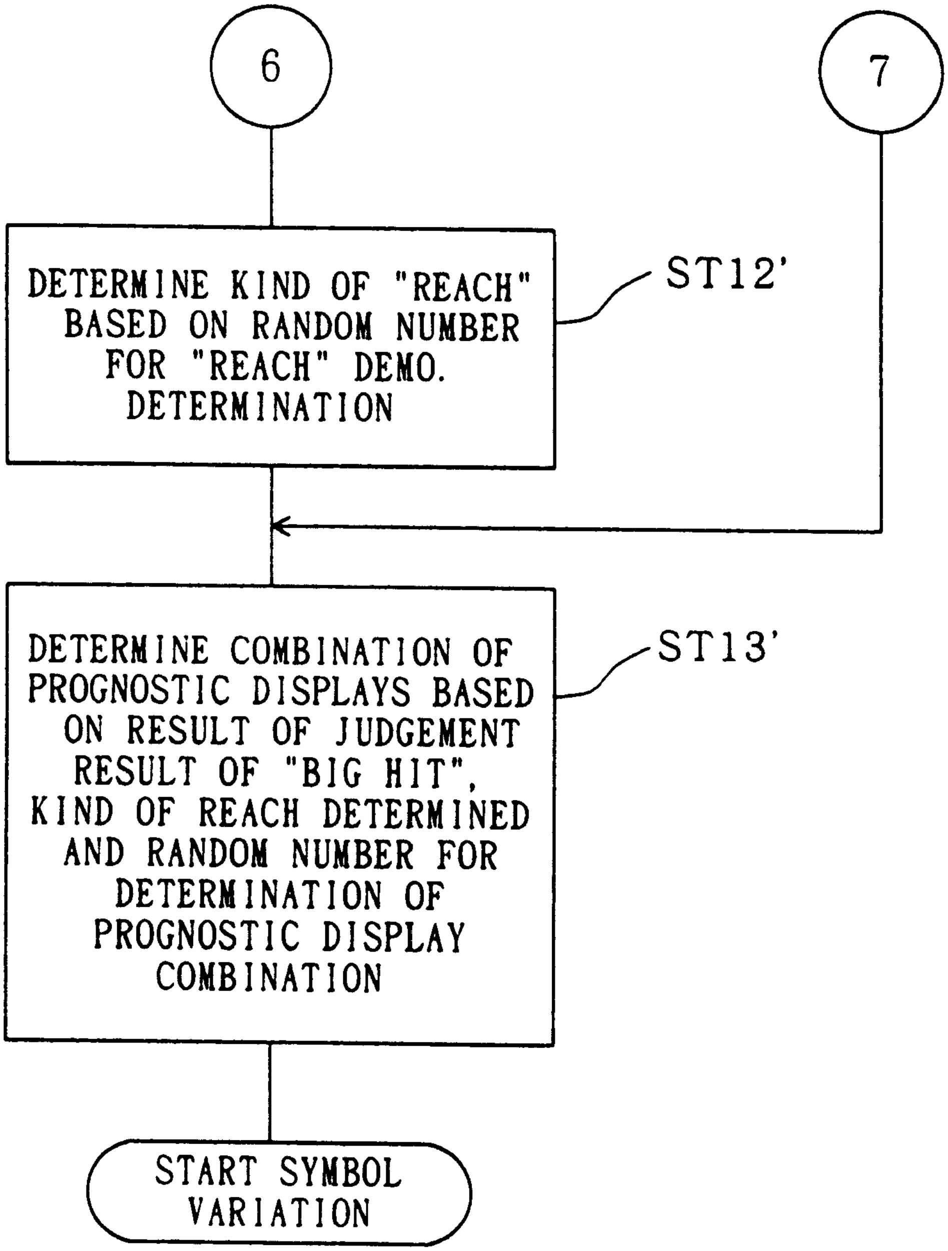
FIG. 44 is a continuation of the flowchart of FIGS. 42 and 43.

After determination of the stop symbols to be displayed in symbol variation display portion 2*a*, the procedure of step ST12' shown in FIG. 44 is executed. First, the type or kind of the "reach demonstration" to be displayed is determined based on the random number for the determination of the reach demonstration that was extracted in the procedure of step ST4'. If the "big hit" has been determined in the above-mentioned procedure, the "table for the determination of reach demonstration for big hit" shown in FIG. 12 is selected to determine the "reach demonstration."

Next, in step ST13', a combination of the prognostic displays to be displayed, that is, a combination of prognostic facial expressions, is determined with reference to the face symbol determination table of FIG. 52, as will be described herein. This determination is based on the result of the determination of the "big hit" "reach demonstration" that has been determined, and the extracted random number for the "first prognostic display determination."

The following is a description of a procedure for determining the combination of the prognostic facial expressions to be displayed. The procedure is executed with reference to the prognostic facial expression determination tables shown in FIGS. 46 to 51 that are correlated to the result of the determination of the "big hit," the result of the determination of the "reach demonstration," and the extracted random number for the determination of the prognostic display combination. As mentioned above, the random number for the determination of the prognostic display combination is extracted in the range from 0 to 39. In the prognostic facial expression combination determination tables shown in FIGS. 46 to 51, predetermined ranges of random number values are associated with combinations of the two prognostic facial expressions ("prognostic facial expression 1"+"prognostic facial expression 2"), respectively.

When the determination of the "big hit" results in a "big hit" and the result of the determination of the "reach demonstration" corresponds to the "clapping reach" demonstration (I), the prognostic facial expression combination determination table of FIG. 46 is referenced for determining a combination of prognostic facial expressions based on the random number extracted for the determination of the prognostic display combination. If the extracted random number for the determination of the prognostic display combination belongs to the range of 0 to 11, the combination of the prognostic facial expressions of "A-A" is determined. Then, referring to face symbol determination table shown in FIG. 52, face symbol 1-face symbol 1 is selected as the combination of the prognostic facial expressions of "A-A" when the extracted random number for the prognostic display combination determination in the range of 1 to 11 is an even number, (i.e., 0, 2, 4, 6, 8, 10). Face symbol 2-face symbol 2 is selected when the extracted random number for the prognostic display combination determination in the range from 1 to 11 is an odd number, (i.e., 1, 3, 5, 7, 9, 11). In the face symbol combination determination table shown in FIG. 46, when the extracted random number for the prognostic display combination determination is 12, the combination of prognostic facial expressions is "A-B." Referring to the A group and the B group in the face symbol determination table of FIG. 52, face symbol 1 is selected as "prognostic facial expression 1" and face symbol 3 is selected as "prognostic facial expression 2," because the random number for the prognostic display combination determination is an even number.

In the prognostic facial expression combination determination tables of FIGS. 46 to 51, the values of random numbers are not assigned in equal distributions to the various combinations of the prognostic facial expressions accommodated in each table. More specifically, each table does not accommodate all of the combinations of the prognostic facial expressions, and some combinations are designated to a wider range of random number values as compared to other combinations, whereby some combinations are more often selected. In each prognostic facial expression combination determination table, the random number value range assigned in this embodiment of the invention to each of the combinations of the prognostic facial expressions is not uniform. For example, the combination of "A-A" is a combination that has a high likelihood of the "big hit" and hence this combination is accommodated to a greater extent in the prognostic facial expression combination determination tables ((I) of FIG. 46 to (III) of FIG. 48) that are referred to when the "big hit" determination results in the "big hit." In other words, the sum of the random number value range for all of the "A-A" combinations accommodated in the prognostic facial expression combination determination table that is referred when the "big hit" determination results in a "big hit" is larger than the sum of the random number value range of all of the "A-A" combinations accommodated in the prognostic facial expression combination determination table that is referenced when the "big hit" determination results in a "loss."

In each of the prognostic facial expression combination determination tables, the random number value range corresponding to the "A-A" combination of the prognostic facial expressions is different from the random number value range for the other combinations, and the random number value range associated thereto is also biased (i.e., not uniformly distributed) for each of the prognostic facial expression combinations.

Since the combination of "A-A" is not included in the (V) "loss+Harite reach" of FIG. 50 and in the (VI) "loss+no reach" of FIG. 51, if the combination "A-A" should appear, then the combination of "loss" and "Harite reach" and the combination of "loss" and "no reach" may not appear.

Since the "big hit+all rotation reach" of (III) in FIG. 48 has associated therewith a relatively high likelihood of the appearance of the "big hit," the combinations of the prognostic facial expressions having low likelihood for appearance of the "big hit," such as the combination of "D-C" and the combination of "D-D," etc, are not included. Therefore, when the combinations of the prognostic facial expressions of "D-C," "D-D," etc. appear, the combination of the "big hit" and the "all rotation reach" never appear.

By providing the above prognostic display, a player can, through experience, infer detailed information from these prognostic displays. Therefore, by watching a prognostic display, the expert player can determine in some instances that the prognostic display may develop into a particular kind of "reach demonstration," and ultimately develop into the "big hit" with significant certainty.

In addition to the foregoing, by displaying the first prognostic display ("prognostic facial expression 1") and the second prognostic display ("prognostic facial expression 2") successively with the passage of time, the player will easily remember the change of a series of movements or the change of the facial expressions. Furthermore, the display time of two prognostic displays can be made quite short. In such a case, the interest of the player in the game may be enhanced, because the player is invited to concentrate.

Two or more kinds of prognostic displays may be provided in accordance with the invention, and the mode of the combination also may be selected optionally. The change of the display may be executed in the manner such as, "prognostic facial expression 1"→"prognostic facial expression 2"→"prognostic facial expression 3"→"prognostic facial expression 1."

It is to be understood that the above embodiments are directed to the pachinko game machine, which is a specific illustrative embodiment of the invention. However, the present invention can be applied to the other gaming machines, such as a television gaming machine having an electric display device and another display device as well, or a single display device that can be divided into plural display windows.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A gaming machine comprising:

a symbol display arrangement for displaying a plurality of symbols necessary for a game, the plurality of symbols being varied in a variation action that is initiated in response to the satisfaction of a predetermined condition;

a predictive display arrangement for performing a predictive display that indicates the likelihood of the appearance of a specific symbol display state upon the stopping of the variation action of the symbols displayed by said symbol display arrangement; and a controller for determining whether or not the symbol variation action displayed by said symbol display arrangement is to be stopped so as to display the specific symbol display state, and for selecting a predictive display mode from among a plurality of predetermined predictive display modes, said controller being arranged to control said predictive display arrangement so that the likelihood of the appearance of the specific symbol display state is changeable in conjunction with a change in the game responsive to the passage of time.

2. The gaming machine according to claim 1, wherein said predictive display is arranged to be performed one or more times until the variation action of any one of the symbols is stopped.

3. The gaming machine according to claim 1, wherein said predictive display is arranged to be performed one or more times until the variation actions of any two of the symbols are sequentially stopped.

4. The gaming machine according to claim 1, wherein said predictive display is arranged to be performed one or more times until the variation actions of three of the symbols are sequentially stopped.

5. The gaming machine according to claim 1, wherein said predictive display is arranged to be performed one or more times until the variation action of any one of the symbols is stopped, and a further one or more times until the variation actions of any two of the symbols are sequentially stopped.

6. The gaming machine according to claim 1, wherein said predictive display is arranged to be performed one or more times until the variation action of any one of the symbols is stopped, and a further one or more times until the variation actions of any three of the symbols are sequentially stopped.

7. The gaming machine according to claim 1, wherein said predictive display is arranged to be performed one or more times until the variation actions of any two of the symbols are sequentially stopped, and a further one or more times until the variation actions of three of the symbols are sequentially stopped.

8. The gaming machine according to claim 1, wherein said predictive display is arranged to be performed one or more times until the variation action of any one of the symbols is stopped, and a further one or more times until the variation actions of two of the symbols are sequentially stopped, and a still further one or more times until the variation actions of three of the symbols are sequentially stopped.

9. A gaming machine comprising:

a symbol display arrangement for displaying a plurality of symbols necessary for a game, the plurality of symbols being varied in a variation action that is initiated in response to the satisfaction of a predetermined condition;

a predictive display arrangement for performing a first predictive display that indicates a first likelihood of the appearance of a specific symbol display state upon the stopping of a variation action of the symbols displayed by said symbol display arrangement, and for performing a second predictive display that indicates a second likelihood of the appearance of the specific symbol display state in response to the satisfaction of a further predetermined condition; and a controller for determining whether or not the variation action is to be stopped so as to display the specific symbol display state, and for selecting a predictive display mode from a plurality of predetermined first predictive display modes, and a further predictive display mode from a plurality of predetermined second predictive display modes, wherein said controller is arranged to control said predictive display arrangement so that the likelihood of the appearance of the specific symbol display state by the second predictive display is changeable in conjunction with a change in the game responsive to the passage of time.

10. The gaming machine according to claim 9, wherein said predictive display is arranged to be performed one or more times until the variation action of any one of the symbols is stopped.

11. The gaming machine according to claim 9, wherein said predictive display is arranged to be performed one or more times until the variation actions of any two of the symbols are sequentially stopped.

12. The gaming machine according to claim 9, wherein said predictive display is arranged to be performed one or more times until the variation actions of three of the symbols are sequentially stopped.

13. The gaming machine according to claim 9, wherein said predictive display is arranged to be performed one or more times until the variation action of any one of the symbols is stopped, and a further one or more times until the variation actions of any two of the symbols are sequentially stopped.

14. The gaming machine according to claim 9, wherein said predictive display is arranged to be performed one or more times until the variation action of any one of the symbols is stopped, and a further one or more times until the variation actions of any three of the symbols are sequentially stopped.

15. The gaming machine according to claim 9, wherein said predictive display is arranged to be performed one or more times until the variation actions of any two of the symbols are sequentially stopped, and a further one or more times until the variation actions of three of the symbols are sequentially stopped.

16. The gaming machine according to claim 9, wherein said predictive display is arranged to be performed one or more times until the variation action of any one of the symbols is stopped, and a further one or more times until the variation actions of two of the symbols are sequentially stopped, and a still further one or more times until the variation actions of three of the symbols are sequentially stopped.

17. A gaming machine comprising:

a symbol display arrangement for displaying a plurality of symbols necessary for a game, the plurality of symbols being varied in a variation action that is initiated in response to the satisfaction of a predetermined condition;

a predictive display arrangement for performing a first predictive display that indicates a first likelihood of the appearance of a specific symbol display state upon the stopping of a variation action of the symbols displayed by said symbol display arrangement, and a second predictive display that indicates a second likelihood of the appearance of the specific symbol display state in response to the satisfaction of a further predetermined condition; and a controller for determining whether or not the variation action is to be stopped so as to display the specific symbol display state, and for selecting a first predictive display mode from a plurality of predetermined first predictive display modes, and for selecting a second predictive display mode from among a plurality of predetermined second predictive display modes, wherein said controller is arranged to control said predictive display arrangement to perform said first predictive display after performance of said second predictive display, said first and second predictive displays having associated therewith respective likelihoods of the appearance of the specific symbol display state, at least one of the likelihoods being changeable in conjunction with a change in the game responsive to the passage of time.

18. The gaming machine according to claim 17, wherein said at least one of the likelihoods is arranged to be changeable by displaying a plurality of predictive display symbols subsequently.

19. The gaming machine according to claim 18, wherein said controller is provided with a predictive display memory for storing a plurality of predictive image display groups, each being provided with plurality of predictive display symbols correlated to respectively associated probabilities.

20. The gaming machine according to claim 19, wherein the probability is changeable in response to the stop timing of the variation action of the symbols being displayed by said symbol display arrangement.

21. The gaming machine according to claim 18, wherein the plurality of predictive display symbols are displayed sequentially.

22. The gaming machine according to claim 21, wherein a combination of the plurality of predictive display symbols being displayed sequentially depicts a story line.

23. The gaming machine according to claim 17, wherein said predictive display is arranged to be performed one or more times until the variation action of any one of the symbols is stopped.

24. The gaming machine according to claim 17, wherein said predictive display is arranged to be performed one or more times until the variation actions of any two of the symbols are sequentially stopped.

25. The gaming machine according to claim 17, wherein said predictive display is arranged to be performed one or more times until the variation actions of three of the symbols are sequentially stopped.

26. The gaming machine according to claim 17, wherein said predictive display is arranged to be performed one or more times until the variation action of any one of the symbols is stopped, and a further one or more times until the variation actions of any two of the symbols are sequentially stopped.

27. The gaming machine according to claim 17, wherein said predictive display is arranged to be performed one or more times until the variation action of any one of the symbols is stopped, and a farther one or more times until the variation actions of any three of the symbols are sequentially stopped.

28. The gaming machine according to claim 17, wherein said predictive display is arranged to be performed one or more times until the variation actions of any two of the symbols are sequentially stopped, and a further one or more times until the variation actions of three of the symbols are sequentially stopped.

29. The gaming machine according to claim 17, wherein said predictive display is arranged to be performed one or more times until the variation action of any one of the symbols is stopped, and a further one or more times until the variation actions of two of the symbols are sequentially stopped, and a still further plurality of times until the variation actions of three of the symbols are sequentially stopped.

* * * * *